United States Patent [19]

Nobuta

[11] Patent Number: 5,956,162
[45] Date of Patent: *Sep. 21, 1999

[54] DATA COMMUNICATING APPARATUS FOR SELECTIVELY RECORDING COLOR AND MONOCHROMATIC IMAGES ON DIFFERENT RECORDING MEMBERS

[75] Inventor: Hiroshi Nobuta, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/358,364

[22] Filed: Dec. 19, 1994

[30] Foreign Application Priority Data

Dec. 20, 1993 [JP] Japan ................... 5-344846
Dec. 27, 1993 [JP] Japan ................... 5-348680

[51] Int. Cl.$^6$ .................................... H04N 1/46
[52] U.S. Cl. .................. 358/500; 358/529; 358/434; 358/498; 358/501
[58] Field of Search .................. 358/501, 500, 358/504, 529, 498, 434; 355/311, 313, 316, 317; 347/3, 43, 49, 14; 271/9.01, 9.03, 265.2; 399/388, 390, 28; H04N 1/46

[56] References Cited

U.S. PATENT DOCUMENTS

| | | | |
|---|---|---|---|
| 4,521,805 | 6/1985 | Ayata et al. | 358/75 |
| 4,739,397 | 4/1988 | Hayashi | 350/501 |
| 4,825,256 | 4/1989 | Nakai et al. | 355/403 |
| 4,837,614 | 6/1989 | Omi | 358/512 |
| 5,053,805 | 10/1991 | Sakai et al. | |
| 5,182,796 | 1/1993 | Shibayama et al. | 395/156 |
| 5,315,317 | 5/1994 | Terasawa et al. | 346/1.1 |
| 5,349,450 | 9/1994 | Yoshioka et al. | 358/500 |
| 5,696,598 | 12/1997 | Yoshida et al. | 358/500 |

FOREIGN PATENT DOCUMENTS

| | | |
|---|---|---|
| 0391632 | 10/1990 | European Pat. Off. . |
| 1-182052 | 7/1989 | Japan . |
| 3-164755 | 7/1991 | Japan . |

OTHER PUBLICATIONS

Pat. Abs. Jp., vol. 16, No. 2 (M–1197), Jan. 7, 1992 (JP–A–03227659).

*Primary Examiner*—Kim Yen Vu
*Attorney, Agent, or Firm*—Fitzpatrick, Cella, Harper & Scinto

[57] ABSTRACT

In recording a received image in an image communication apparatus, there is discriminated whether the received image is to be recorded as a color image or as a monochromatic image, then determined, according to the result of the discrimination, which of plural recording members is to be supplied, also the mutually different plural recording members are selectively supplied according to the determination, and the received image is recorded on thus supplied recording member. In this manner it is rendered possible to preferentially select an optimum recording member for monochromatic image recording and another for color image recording, thereby improving the image quality in case of color image recording and reducing the running cost in case of monochromatic image recording.

8 Claims, 32 Drawing Sheets

① STORAGE POSITION OF CARTRIDGE A
② STORAGE POSITION OF CARTRIDGE B
③ HOME POSITION AT RECORDING

| F | A | C | DIS | FCS | F |
|---|---|---|-----|-----|---|

| | bit of EXTENSION AREA | CONTENTS |
|---|---|---|
| 1 | JPEG COLOR FUNCTION | 0 : NO  1 : YES |
| 2 | INTERLEAVE FORMAT ABILITY | 0 : IN ORDER OF BLOCK  1 : IN ORDERS OF BLOCK AND PLANE |
| 3 | SUBSAMPLING RATIO ABILITY | 0 : (ONLY 1:1:1)  1 : (2:1:1 AND ALSO 4:1:1) |
| 4 | YCrCb COLOR SPACE ABILITY | 0 : NO  1 : YES |
| 5 | RGB COLOR SPACE ABILITY | 0 : NO  1 : YES |
| 6 | CMY COLOR SPACE ABILITY | 0 : NO  1 : YES |
| 7 | INTRA-DOCUMENT DIFFERENT ENCODING | 0 : IMPOSSIBLE  1 : POSSIBLE |
| 8 | EXTENSION FIELD bit | 0 |

| bit of EXTENSION AREA | | CONTENTS |
|---|---|---|
| 1 | USE OF JPEG FUNCTION | 0 : DON'T USE  1 : USE |
| 2 | INTERLEAVE FORMAT | 0 : BE IN ORDER OF BLOCK  1 : BE IN ORDER OF PLANE |
| 3<br>4 | SUBSAMPLING RATIO | (0, 0) : 1 : 1 : 1  (0, 1) : 2 : 1 : 1<br>(1, 0) : 1 : 4 : 1 : 1 |
| 5<br>6 | COLOR SPACE DESIGNATION | (0, 0) : CIELAB  (0, 1) : YCrCb<br>(1, 0) : RGB  (1, 1) : CMY |
| 7 | | |
| 8 | EXTENSION FIELD bit | 0 |

IF THERE IS NO COLOR EXTENSION AREA IN DCS, ALL PAGES OF DOCUMENT ARE SUPPOSED TO BE ENCODED WITH MONOCHROME BINARIZATION.

FORMATION OF COMMENT MARKER (COM : FFFD)

FIG. 32
```
NOW TRANSMITTING  03-3758-2111
P.001 (MONOCHROME 000 COLOR 000)
```
FIRST PAGE IS NOW BEING MONOCHROME TRANSMITTED.
```
NOW TRANSMITTING  03-3758-2111
P.005 (MONOCHROME 003 COLOR 001)
```
FIFTH PAGE IS NOW BEING COLOR TRANSMITTED.

FIG. 33

STATUS OF PRINTER

| SYMBOL | EVENT |
|---|---|
| P | THERE IS RECORDING SHEET |
| A | CARTRIDGE A IS SET |
| B | CARTRIDGE B IS SET |
| AC | CARTRIDGE A IS COLOR INK (CMYK) |
| BC | CARTRIDGE B IS COLOR INK (CMYK) |
| AI | THERE IS INK OF CARTRIDGE A |
| BI | THERE IS INK OF CARTRIDGE B |

TURN-ON CONDITION OF COLOR INDICATOR $$P \wedge \{(A \wedge AC \wedge AI) \vee (B \wedge BC \wedge BI)\}$$

TURN-OFF CONDITION OF COLOR INDICATOR $$\overline{P \wedge \{(A \wedge AC \wedge AI) \vee (B \wedge BC \wedge BI)\}}$$

(NOTE) $\overline{X}$ DENOTES NEGATIVE LOGIC OF X $\overline{P} \rightarrow$ THERE IS NO SHEET $\overline{AI} \rightarrow$ INK OF CARTRIDGE A IS RAN OUT $\overline{AC} \rightarrow$ CARTRIDGE IS BLACK INK

FIG. 34

| MARKER CLASSIFICATION | CODED WORD | MEANING |
|---|---|---|
| SOI | FFD8 | START OF IMAGE |
| EOI | FFD9 | END OF IMAGE |
| SOF0 | FFC0 | START OF BASE LINE FRAME |
| SOS | FFDA | START OF SCAN |
| DHT | FFC4 | DEFINITION OF HUFFMAN TABLE |
| DQT | FFDB | DEFINITION OF QUANTIZATION TABLE |
| DRI | FFDD | DEFINITION OF RESTART INTERVAL |
| COM | FFFD | COMMENT |
| DNL | FFDC | DEFINITION OF NUMBER OF LINES |

DATA COMMUNICATING APPARATUS FOR SELECTIVELY RECORDING COLOR AND MONOCHROMATIC IMAGES ON DIFFERENT RECORDING MEMBERS

BACKGROUND OF THE INVENTION

1. Field of the Invention

The present invention relates to an image communicating apparatus, and more particularly to an image communicating apparatus capable of transmitting and/or receiving a color image.

2. Related Background Art

With the recent progress in the functions of the image recording means and image display means, the color copying machines and the color printers are becoming rapidly popular, and, also in the field of image communicating apparatus, color facsimile apparatus and similar products are being developed.

However such color copying machine or color facsimile apparatus is principally designed for the color image only, and is generally more bulky and more expensive than the apparatus for handling monochromatic image.

On the other hand, the communication method for the color facsimile is being standardized under the ITU-T recommendation (formerly CCITT recommendation), and the JPEG (Joint Photographic Expert Group) system, for color image encoding, is already adopted as a part of T.80 series.

Also as the recording method for the color facsimile, there are already known the thermal sublimation transfer method, thermal fusion transfer method, electrophotographic method, ink jet recording method etc., among which the former three are superior in the color reproducing capability and are suitable for use in the apparatus designed exclusively for the color image, but are expensive in the running cost. On the other hand, the ink jet recording method is already used in the color printers, and is attracting attention as an inexpensive method easily adaptable to color image and black-and-white image, though it is inferior in the color reproducing ability to the former three.

As explained in the foregoing, color image processing has become popular in the communication equipment, and various products have been commercialized in the field of color facsimile, but such products need to be improved in the following aspects:

1. high price and high running cost;
2. inconvenient for black-and-white image handling, in the exclusive-color apparatus;
3. difficulty in expansion of color function, from the current G3 facsimile format; and
4. deterioration of characters, by JPEG process, in the header information of the transmitting side.

These aspects will be individually discussed in more details in the following:

1. High price and high running cost:

The color facsimile apparatus is at least 5 to 10 times more expensive than the ordinary G3 facsimile apparatus, and the running cost is also high, because of the following reasons:

1) The amount of information of a full-color image is 24 times of that of a black-and-white binary image of a same resolving power, so that a large cost is required for the image memory;
2) The color recording unit by the thermal transfer method or the electrophotographic method requires a high manufacturing cost;
3) The thermal transfer method or the electrophotographic method requires a special color recording sheet, leading to a high running cost;
4) The ink jet recording method is less expensive in the cost of the recording unit and in the running cost, but requires frequent ink replenishment, because of the often limited ink capacity.

2. Inconvenience for black-and-white image handling, in the exclusive-color apparatus:

If the running cost in the recording unit is high, the running cost for the black-and-white image becomes also high, so that the apparatus becomes usable only for the color image. Consequently the user wishing to handle the monochromatic images and the color images equally has to purchase the inexpensive monochromatic apparatus and the expensive color apparatus, so that the efficiency of office space becomes lower and the cost of purchase is also burdensome.

For this reason there is required an inexpensive color facsimile apparatus capable of monochromatic image handling equivalent to that in the ordinary monochromatic apparatus and also of transmission and reception of the color image.

Besides, the document to be transmitted is in most cases not composed of color pages only, but usually contains the color image and the monochromatic image in mixed manner in the unit of pages, for example a top page of monochromatic text followed by color pages. Transmission of such document entirely in the color mode will deteriorate the transmission speed, and the image quality of the monochromatic page is often deteriorated.

3. Difficulty of expansion of color function from the current G3 facsimile format:

The ability to communicate with the currently most popular G3 facsimile is an important feature, but the color function is not standardized in the G3 format but is realized only between the apparatus of a same manufacturer, according to a mode specific thereto. Thus the color image communication between the apparatus of different manufacturers is not possible by the protocol signals based on the current G3 standard.

4. Deterioration of characters by the JPEG process, in the header information of the transmitting side:

Most G3 facsimile apparatus adds, in the transmission, the header information as a part of the transmitted image. The header information generally includes the telephone number and abbreviation of the transmitting terminal, calendar information such as year, month, date and time, and the transmitted page number. Such header information is developed, at the transmitting side, from the character information into the image data, then subjected to binary compression encoding (such as MH encoding) and transmitted to the receiving side.

However, in the transmission of a multi-value color image by the JPEG process, it is already known, if such header information is added to the image and subjected to such JPEG process, that the characters contained in said header information are significantly deteriorated by the properties of JPEG process and often become illegible depending upon the character size. For this reason, in the color image transmission, it is required to use larger characters in the header information in order to maintain legibility. This leads to a drawback that the area of the header information becomes larger in the image reproduced at the receiving side.

SUMMARY OF THE INVENTION

An object of the present invention is to provide an image communication apparatus capable of efficiently handling an original containing color images and monochromatic images in mixed manner as mentioned above.

Another object of the present invention is to provide an image communication apparatus capable of selecting optimum sheet at the printing operation, thereby improving the image quality and reducing the total running cost.

The above-mentioned objects can be attained, according to an aspect of the present invention, by an image communication apparatus capable of recording a received image, comprising discrimination means for discriminating whether a received image is to be recorded as a color image or as a monochromatic image; supply means capable of supplying mutually different plural recording members; control means for determining which of said plural recording members is to be supplied, according to the output of said discrimination means; and recording means for recording said received image on the recording member supplied by said supply means.

Still other objects of the present invention, and the features thereof, will become fully apparent from the following detailed description of the preferred embodiments of the present invention, to be taken in conjunction with the attached drawings.

BRIEF DESCRIPTION OF THE DRAWINGS

FIG. 32 is a plan view showing the transition of display of a page counter in the transmitting operation of the apparatus of the above-mentioned embodiment;

FIG. 33 is a table indicating the relationship between the printer status and the indicator in the apparatus of the above-mentioned embodiment; and FIG. 34 is a table showing marker codes of the image frame and various parameters to be employed in the apparatus of the above-mentioned embodiment.

DESCRIPTION OF THE PREFERRED EMBODIMENTS

Figure 1:
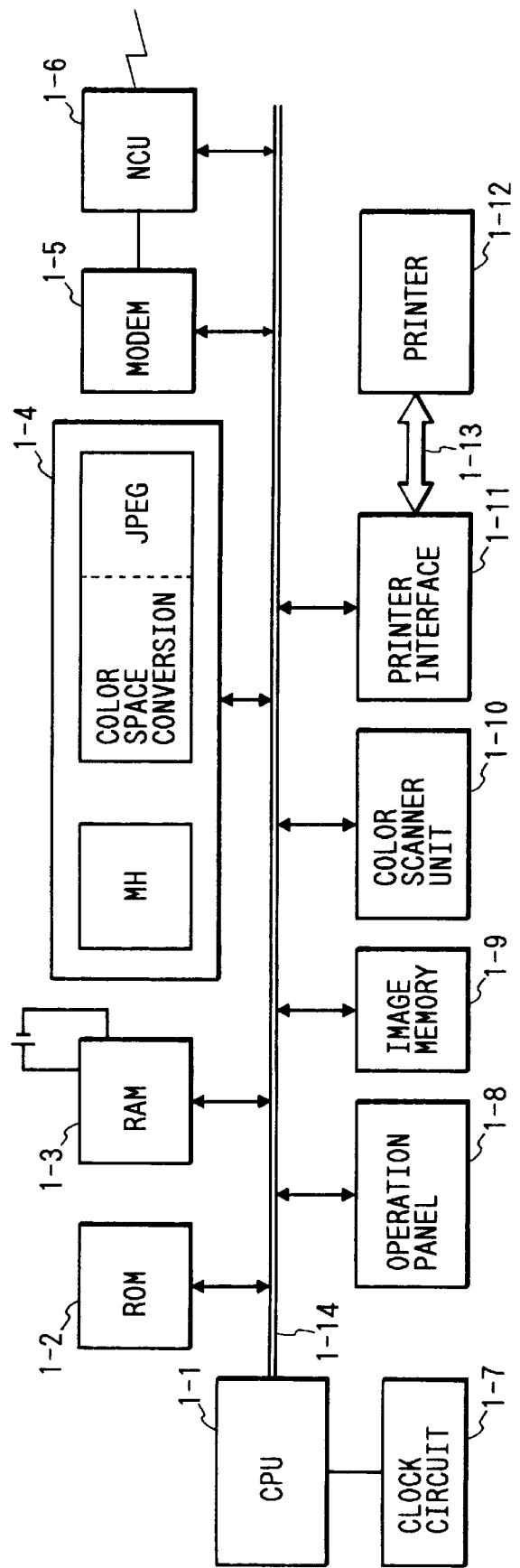
FIG. 1 is a block diagram of the entire configuration of a color image communicating apparatus constituting an embodiment of the present invention.

In the following there will be explained an embodiment of the color image communicating apparatus of the present invention, said embodiment being characterized by the following features:

(1) It is provided with memory control means for processing a monochromatic image through an image memory in the monochromatic communication state, control means for processing a color image without accumulation in said image memory in the color communication state, and switching control means for switching the above-mentioned means;

(2) It employs the ink jet method in the recording unit, and is provided with means for loading plural ink cartridges in a single recording unit;

(3) It is provided with composing means capable of selecting, for the plural ink cartridges, an arbitrary combination of a monochromatic ink cartridge and color ink cartridges.

(4) It is provided with automatic selection means for identifying the operation mode and automatically selecting the optimum ink cartridge;

(5) It is provided with plural recording sheet cassettes and selection control means for varying the method of cassette selection in the color image printing operation and in the monochromatic image printing operation;

(6) It is provided with selection instruction means for selecting, in the document to be transmitted, pages for color communication and a pages for monochromatic communication, by the unit of each page;

(7) It is provided with encoding control means for encoding, by a multi-value image compression method, the image of a page designated for color communication by said selection instruction means, and, by a binary image compression method, the image of a page designated for monochromatic communication;

(8) It is provided with operation control means for adopting a common operation method for designation of the resolving power for color original reading and for monochromatic original reading;

(9) It is provided with instruction means for instructing, prior to the start of communication, presence of a page to be transmitted by color communication in the document to be transmitted, and control means for activating information means to the operator, in case said instruction means instructs the presence of a page to be transmitted by color communication and, after the start of communication, the absence of color receiving ability is detected by a response signal from a destination unit;

(10) It is provided with display means, in case the instruction means in (6) selects a page for color communication and during the color communication of said page, for displaying by visual means that the instruction is executed;

(11) It is provided with detection means for detecting the state of the recording unit, discrimination means for discriminating whether a color printing operation can be executed according to the detection by said detection means, and communication control means for informing, after response to received message, the partner unit of the absence of color receiving ability in case said discrimination means provides a negative result;

(12) It is provided with means for adding character information, including an own terminal ID code, calendar information and transmitted page number to the parameter of the comment marker (COM) in the JPEG encoded data, and means for adding the comment marker to each page;

(13) It is provided with means for printing the content of the parameter of the comment marker in the received JPEG codes, on a recording sheet on which an image page including said comment marker is recorded;

(14) It is provided with header information preparation control means adapted, in the transmission side for transmitting a document containing monochromatic pages and color pages in mixed manner, in the transmission of a binary-encoded monochromatic page, for preparing the header information of the page (transmitting unit ID, calendar information, page number etc.) as an image and transmitting said header information after addition thereof to the transmitted image, and, in the transmission of a multi-value encoded color page, for transmitting said header information of the page without addition to the image data;

(15) It is provided with setting means for expanded setting of the color communication parameters according to the content of the standard signals defined in the ITU-T recommendation T.30;

(16) It is provided with identification means for extracting and identifying the color communication parameters from the content of the standard signals defined in the ITU-T recommendation T.30;

(17) It is provided with reception control means adapted, in case color communication parameters are transmitted, together with DCS, from a partner terminal, for effecting immediate image output without accumulation of the received image in an image memory, and, in case the color communication parameters are not at all communicated in association with DCS, for effecting the image output together with the accumulation of the received image in the image memory;

(18) It is provided with counting means for individually counting the number of color recorded pages and the number of monochromatically recorded pages;

(19) It is provided with counting means for individually counting the number of color transmitted pages and the number of monochromatically transmitted pages;

(20) It is provided with memory means for memorizing the result of counting according to (18) or (19);

(21) It is provided with display means for displaying the result of counting according to (18) or (19).

Now the color image communicating apparatus embodying the present invention will be explained in detail, with reference to the attached drawings.

FIG. 1 is a block diagram showing the configuration of an embodiment of the present invention.

The image communicating apparatus of the present embodiment is a facsimile apparatus having G3 facsimile functions and adapted to be connected to an analog telephone line, and additionally provided with the functions for transmission and reception of a color image.

In FIG. 1, there are shown a CPU 1-1 for controlling the entire apparatus; a ROM 1-2 used as a program memory for storing programs for various controls by the CPU 1-1; and a RAM 1-3 used for example as a work area for the CPU 1-1 and backed up with a battery so as not to lose the content of memory.

An encode/decode unit 1-4 is provided, as will be detailedly explained later with reference to FIGS. 4 and 5, a raster-block conversion unit 4-1, a color converter 4-2, a JPEG encoding unit 4-3 and an MH encoding unit 4-5 as the transmission system, and with a block-raster conversion unit 5-1, a color converter 5-2, a JPEG decoding unit 5-3 and an MH decoding unit 5-5 as the reception system.

There are further provided a known MH encode/decode unit for MH encoding of the entered binary monochromatic signal and for decoding of the MH codes into binary monochromatic signals; and a JPEG encode/decode unit and a color conversion circuit for conversion of multi-value color component input signals of red, green and blue of 8 bit/pixel into three signal components of Y, Cr and Cb and generating encoded data by the JPEG baseline encoding, or decoding of JPEG baseline encoded data into Y, Cr, Cb multivalue data of 8 bit/pixel and conversion of said Y, Cr, Cb signal components into C, M, Y, K signals to be used on the printer.

A modem 1-5 effects modulation and demodulation of the transmission and reception signals, based on the ITU-T recommendation V.17. An NCU (network control unit) 1-6 effects connection control with a telephone network. A timer unit 1-7 is composed for example of a clock LSI having calendar function.

An operation panel 1-8 is provided with various operation keys and display units, of which details will be explained later with reference to FIG. 3. An image memory 1-9 is composed of a semiconductor memory, so controlled as to store the image data in the unit of a page.

A color scanner 1-10 optically reads an original with separation into R, G and B components, and releases each color in each pixel as multi-value data of 8 bits. In the present embodiment a color contact sensor is employed as the reading device, and an automatic document feeder is provided for automatic feeding of the originals to be read.

Figure 5:
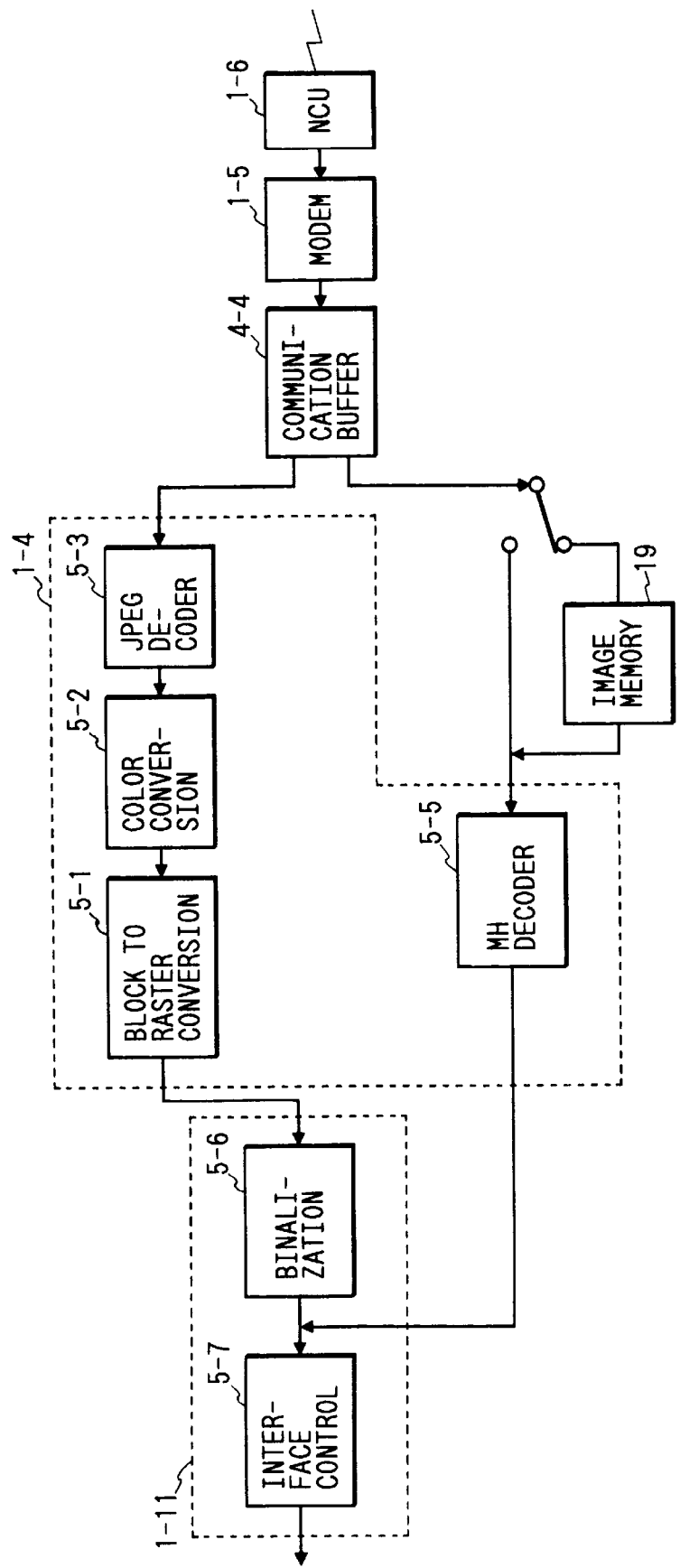
FIG. 5 is a block diagram showing the data flow in the reception by the apparatus of the above-mentioned embodiment.

A printer interface 1-11 is provided, as shown in FIG. 5, with a binarizing unit 5-6 and an interface control unit 5-7, and effects connection control with a printer unit 1-12 by a general interface 1-13 according to the centronics specification. It controls the general interface 1-13 in such a manner that multi-value input signals of C, M, Y and K colors are transmitted to the printer unit after conversion of each color data into binary data and that monochromatic binary input data are transmitted directly to the printer unit. It also has the function of detecting the status of the printer unit through this interface 1-11 and informing the CPU 1-1 of said status.

The printer unit 1-12 is capable of color recording and monochromatic recording by the ink jet recording system. There is further provided a CPU bus 1-14 in the present communication apparatus.

Figure 2:
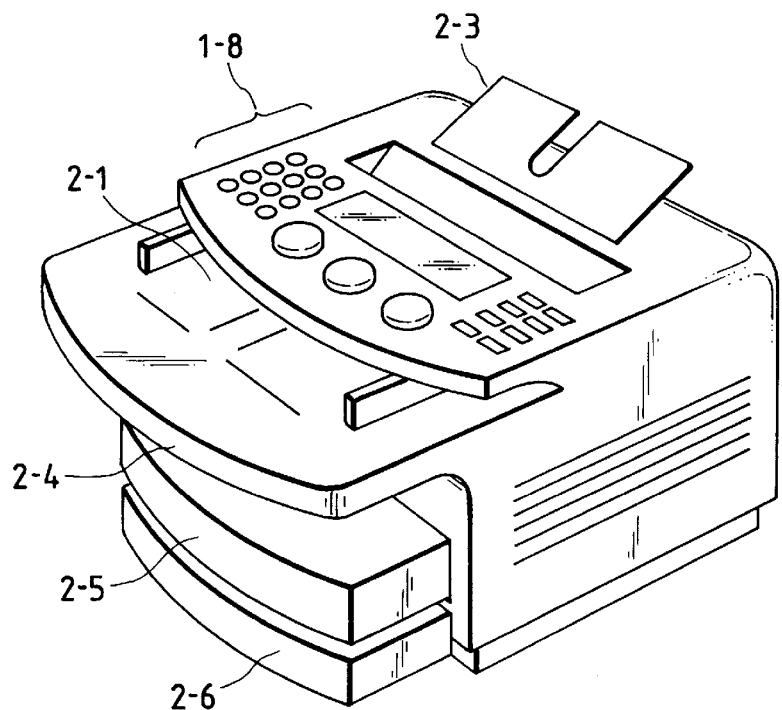
FIG. 2 is an external perspective view of the apparatus shown in FIG. 1.
Figure 3:
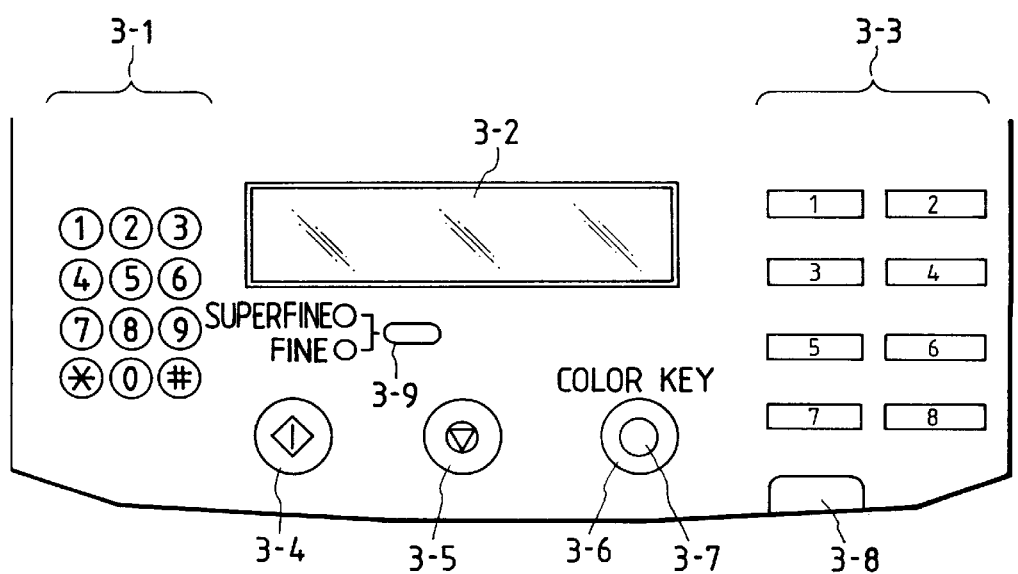
FIG. 3 is a plan view of an operation panel of the apparatus of the above-mentioned embodiment.

FIG. 2 is an external perspective view of the present communication apparatus, and FIG. 3 is a plan view of the operation panel 1-8 mentioned above.

Referring to FIG. 2, an original table 2-1 for setting the originals is provided on an upper face of the casing of the apparatus, and the operation panel 1-8 is provided thereon. An original discharge tray 2-3 is provided behind said operation panel. Also on the front face of the casing of the apparatus there is provided a recording sheet discharge unit 2-4, and a first recording sheet cassette 2-5 and a second recording sheet cassette 2-6 for storing the recording sheets are provided thereunder. For example the first cassette 2-5 can contain sheets suitable for color recording, whereas the cassette 2-6 can contain sheets suitable for monochromatic recording.

Referring to FIG. 3, numeral keys 3-1 are composed of twelve keys of 0–9, # and * and are principally used for entering telephone numbers. An LCD unit 3-2 provides displays indicating the status of the apparatus or for confirming the entered telephone number.

One-touch keys 3-3 are used for one-touch transmission by reading address numbers stored in advance in the RAM 1-3. A start key 3-4 is used for instructing, for example, the start of transmission, and a stop key 3-5 is used for interrupting the operation in progress.

A color key 3-6, for instructing the process as a color original, is provided with lamps respectively in the outer frame portion and in the internal portion of said key. The internal lamp in the color key 3-6 is indicated by 3-7. A color indicator lamp 3-8 is turned on when a state, capable of color recording, in the printer unit 1-12 is detected.

Figure 20:
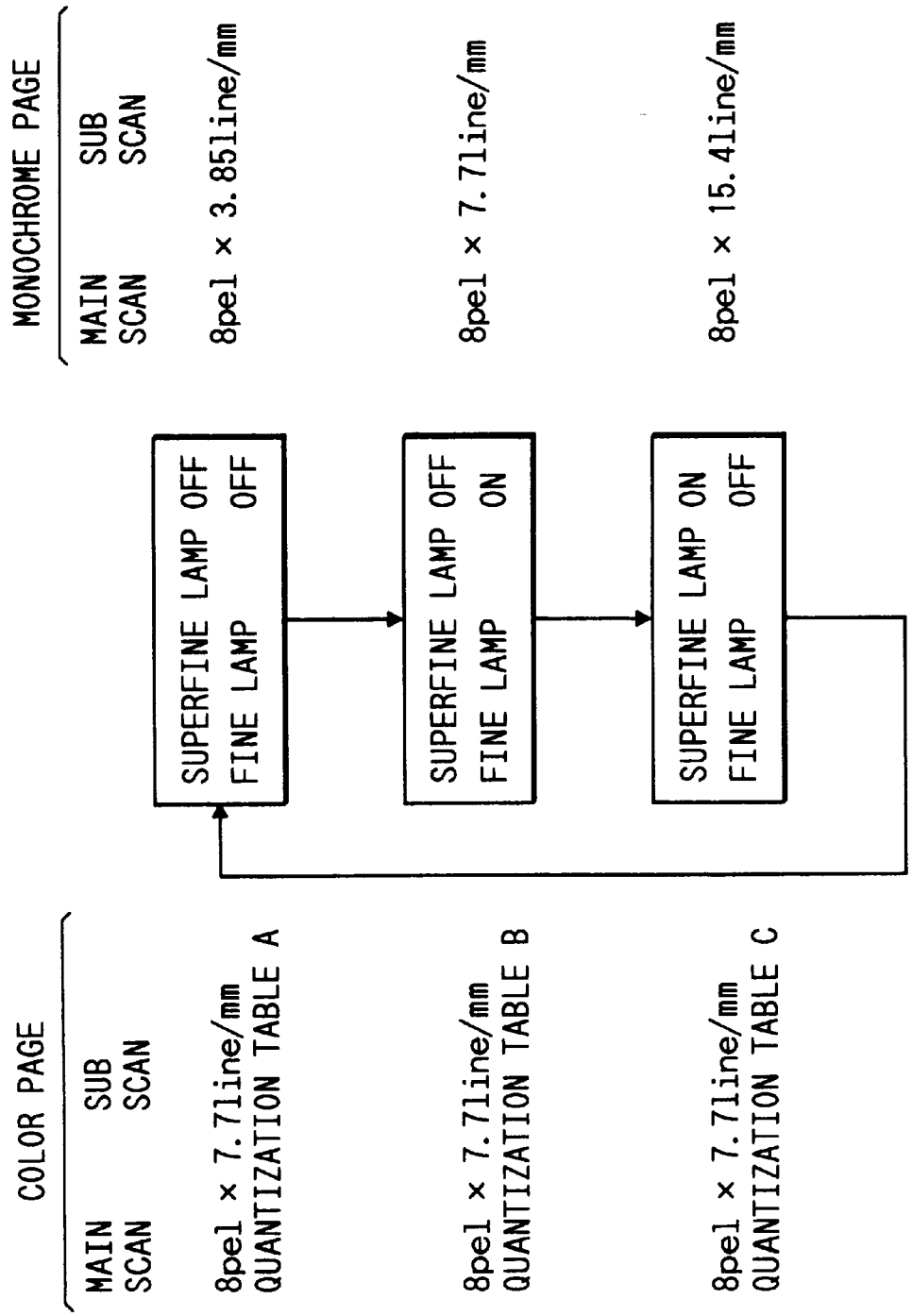
FIG. 20 is a schematic view showing the setting sequence of the reading resolution in the apparatus of the above-mentioned embodiment.

A resolution selecting key 3-9 is used for switching the resolution of original image reading, and the state varies upon each depression as shown in FIG. 20. The resolution of the image transmitted can be regulated by said key 3-9, either in monochromatic image reading or in color image reading.

In the present embodiment, because of the difference in characteristics between the full color image and the monochromatic image, the resolution in the monochromatic mode is made selectable as 8 pel×15.4 line/mm in the super fine mode, 8 pel×7.7 line/mm in the fine mode or 8 pel×3.85 line/mm in the normal mode, while that in the full color mode is fixed at 8 pel×7.7 line/mm but the content of the dot quantizing table (DQT), used in the JPEG baseline encoding, is changed in the super fine, fine and normal modes. This is because it is already known, in the JPEG encoding of a full color image, that the image quality is less influenced by an expansion in the quantizing step, through a variation in the content of the quantizing table, rather than a decrease in the image reading resolution.

Figure 4:
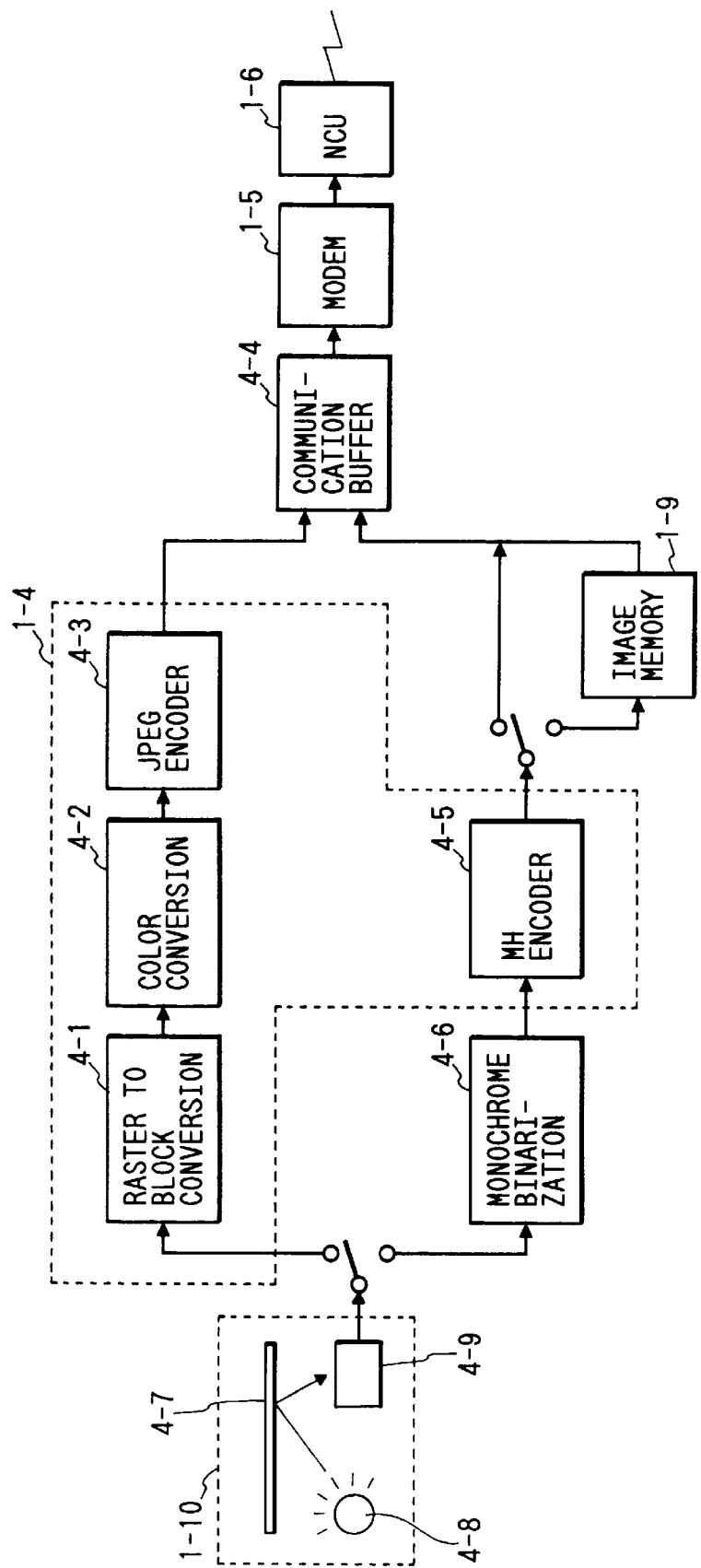
FIG. 4 is a block diagram showing the data flow in the transmission by the apparatus of the above-mentioned embodiment.

FIG. 4 is a block diagram showing the data flow of a transmitted image in the present embodiment, and FIG. 5 is a block diagram showing the data flow in a received image.

At the transmitting operation, an original 4-7 is illuminated by a white light source 4-8 and is read by the scanner unit 1-10 including a color contact sensor 4-9, and each analog signal, separated into R, G and B primary colors, is converted into 8-bit digital data which are released from said scanner unit 1-10 to the CPU bus.

In case of color image reading, said data are supplied through the CPU bus to the encode/decode unit 1-4 for raster-block conversion in a buffer memory (raster-block conversion unit 4-1) therein. In this raster-block conversion, the 8-bit data supplied from the scanner unit 1-10 in the order of raster scanning and in the order of R, G and B are re-arranged as blocks, each consisting of a matrix of 8×8 pixels, thereby generating block-sequential data consisting of a R-block, a G-block, a B-block, a R-block, . . .

Then said block-sequential RGB data are subjected to already known color space transformation to obtain block-sequential YCrCb data. Said data are then JPEG encoded and the obtained results are supplied from the encode/decode unit 1-4 to a communication buffer 4-4.

Figure 6:
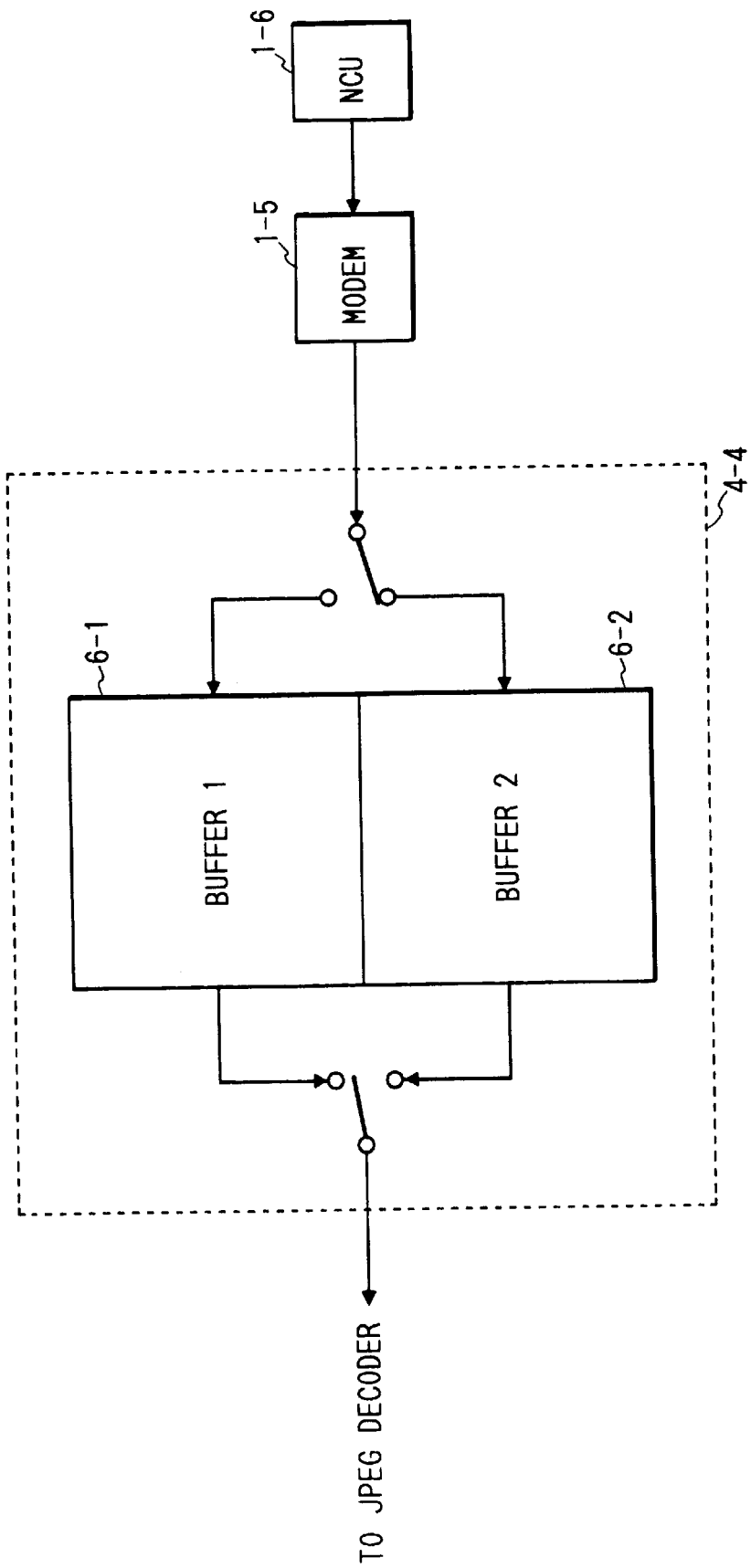
FIG. 6 is a block diagram showing the configuration of a communication buffer in the apparatus of the above-mentioned embodiment.

The communication buffer 4-4 is controlled, as shown in FIG. 6, as double buffers 6-1, 6-2 of a capacity of 64 kByte×2, composed of a part of the RAM 1-3. The JPEG encoded data transmitted by the communication buffer 4-4 are transferred to the modem unit 1-5, and transmitted to the external line from the NCU 1-6.

Consequently the color image is transmitted without page accumulation in the image memory 1-9, because of the following reason.

The amount of JPEG encoded data per page of the color image is usually in a range of 500 kByte to 2 MByte, with the resolution of 8 pel×7.7 line/mm. On the other hand, the image memory 1-9 employed in the present embodiment is of a capacity of 256 kByte, and cannot, therefore, be used as the page memory for the color image. On the other hand, the capacity of 256 kByte can sufficiently store the data of a monochromatic page.

In the following there will be explained, with reference to FIG. 4, the transmission of a monochromatic original.

The RGB data released from the color scanner unit 1-10 to the bus are in succession fetched in the RAM 1-3, and the CPU 1-1 samples the G (green) output data only, as the monochromatic signal, which is binary digitized with a predetermined threshold level in a monochromatic binarizing unit 4-6. The obtained binary monochromatic data are MH encoded in an MH encoder/decoder 4-5 of the encode/decode unit 1-4 in succession and released to the bus.

In case of the monochromatic mode, the CPU 1-1 normally stores the MH encoded data in the image memory 1-9, then calls another terminal after the accumulation of the data of at least a page, and effects data transfer from the image memory 1-9 to the communication buffer 4-4 after the line connection. Thus this is a transmission from the memory.

It is also possible, however, to transmit the data to the communication buffer 4-4 without passing the image memory 1-9, as in the color mode mentioned above.

Now reference is made to FIG. 5 for explaining the data flow of the image data in the reception.

The image data received from the external line through the NCU 1-6 and the modem 1-5 are supplied to the communication buffer 4-4, and, in case of a color image, the image data are transferred therefrom to the encode/decode unit 1-4.

The encode/decode unit 1-4 decodes the received data by JPEG baseline decoding to obtain block-sequential YCrCb data, which are then converted in the color conversion unit into block sequential data of CMY (cyan/magenta/yellow) color space.

Said block-sequential CMY data are then subjected to block-raster conversion to sequential raster data train of C, M and Y colors, which are supplied to the printer interface unit 1-11. Said printer interface 1-11 effects CMYK color separation by black component extraction through the processing of the input data train, and binary digitizes each data for supply to the printer unit 1-12.

In the above-mentioned process, the method for generating binary raster data of C, M, Y and K colors from the multi-value YCrCb block data is already well known.

As explained above, the image memory 1-9 is not used as the color image page memory also in the reception.

In case the data of monochromatic images are received by the communication buffer 4-4, said data are usually accumulated in succession, in the unit of a page, in the image memory 1-9, and are read, after the accumulation of at least a monochromatic page, by the encode/decode unit 1-4 for MH decoding. The decoded monochromatic binary image data are then supplied to the printer interface unit 1-11, which effects control without passing of the binarizing unit 5-6.

It is also possible, however, to transfer the received monochromatic data directly from the communication buffer 4-4 to the MH decoder 5-5.

FIG. 6 is a block diagram showing the control system of the communication buffer 4-4.

The communication buffer 4-4 is composed of a buffer 6-1 of 64 kByte and a buffer 6-2 of 64 kByte, corresponding to the partial page size in the ECM (error correction mode) communication defined in the ITU-T recommendation T.30.

When image data of 64 kBytes (partial page) are received for example by the buffer 6-1, they are checked for data errors, and, in the absence of data errors, the received data are transferred from the buffer 6-1 to the encode/decode unit (or image memory), and, during said transfer, the next partial page is received by the buffer 6-2. In case the reception of the buffer 6-2 is completed during the transfer of the data from the buffer 6-1, an RNR signal is returned to the other terminal to suspend the start of transmission of the next partial page (cf. FIG. 11).

Figure 7:
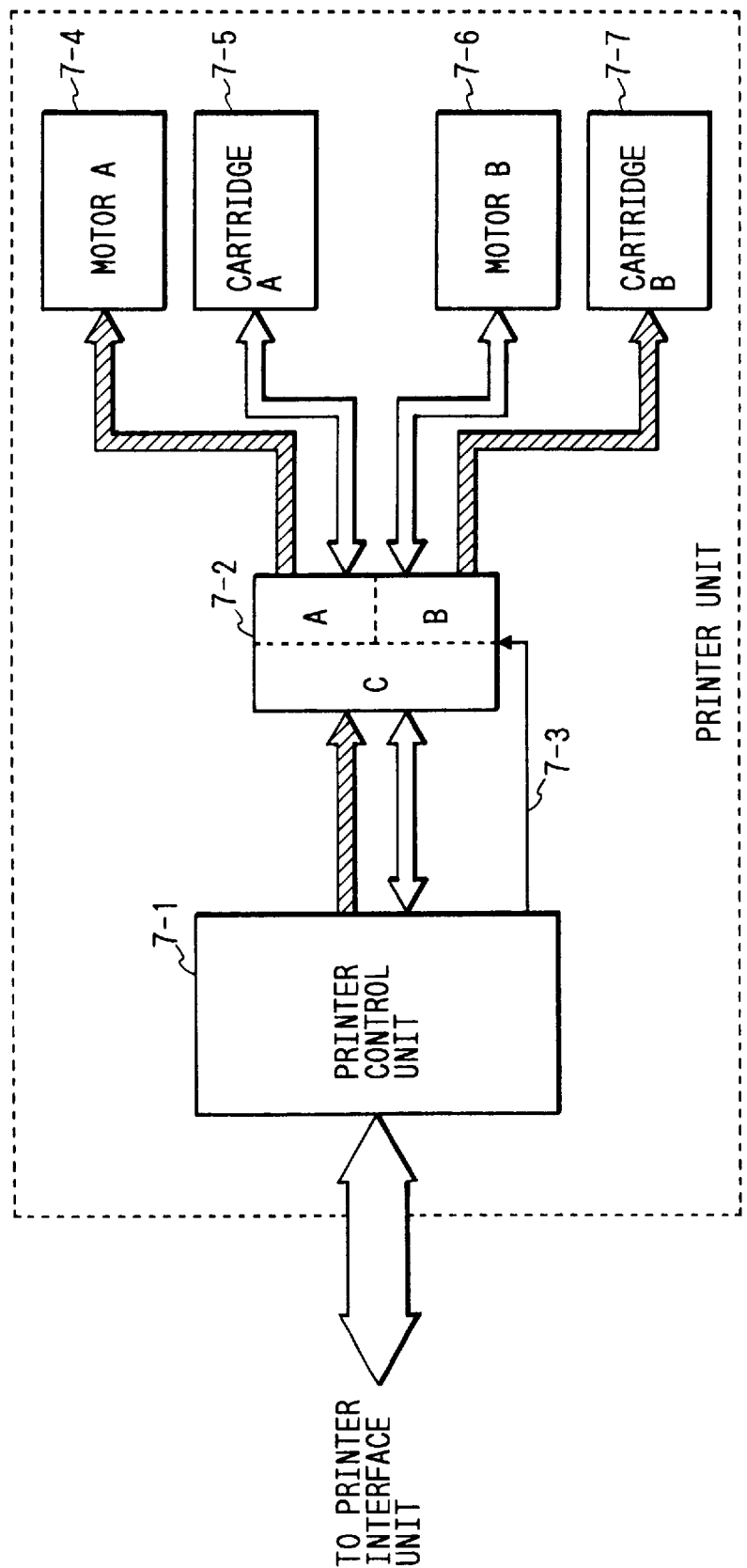
FIG. 7 is a block diagram showing the configuration of a printer unit in the apparatus of the above-mentioned embodiment.

FIG. 7 is a block diagram showing the configuration of the printer unit 1-12.

The printer unit 1-12 is provided with a printer control unit 7-1 for controlling said printer unit 1-12, a cartridge control switch 7-2 for switching the cartridges according to a cartridge switching signal 7-3 from said printer control unit 7-1, a motor A 7-4 for moving a cartridge A 7-5 along the main scanning direction of the recording sheet, and a motor B 7-6 for similarly moving a cartridge B 7-7. At the H-level of the switching signal 7-3, the printer control unit 7-1 is connected to the cartridge A 7-5, thereby activating said cartridge or detecting the status thereof. Also at the L-level state of the switching signal 7-3, the cartridge B 7-7 can be similarly controlled.

Figure 8:
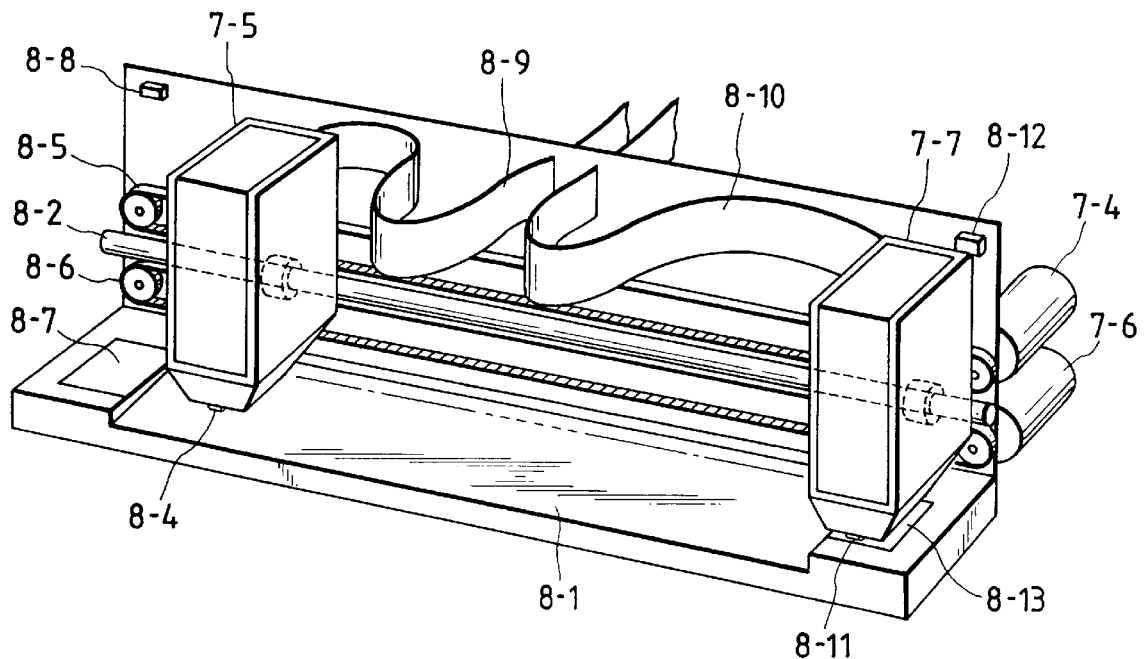
FIG. 8 is a perspective view showing a cartridge moving mechanism in the printer unit shown in FIG. 7.

FIG. 8 is an external perspective view of the cartridges A, B and a driving mechanism for the recording sheet.

On a recording sheet table 8-1, there are provided a common guide shaft 8-2 for moving both cartridges 7-5, 7-7; a drive belt 8-5 for driving the cartridge A along the guide shaft 8-2; a similar drive belt 8-6 for the cartridge B; a retraction area 8-7 for retracted storage of the cartridge A; a retraction sensor 8-8 for detecting that the cartridge A is set in the retracted position; a retraction sensor 8-12 for the cartridge B; a retraction area 8-13 for the cartridge B; a stepping motor A 8-14 for driving the drive belt 8-5 for the cartridge A; and a stepping motor B 8-15 for driving the drive belt 8-6 for the cartridge B.

The cartridge A 7-5 and the cartridge B 7-7, composed of plastic packages of a same shape, are respectively provided with ink discharge heads 8-4, 8-11, and are connected to flexible cables 8-9, 8-10.

The cartridge attachable to said drive belt and said flexible cable is available in two types; one being the monochromatic cartridge in which the ink tank contains black ink only and the nozzles of the discharge head are all designed for the black ink; and the other being the color cartridge which is same in the external shape as said monochromatic cartridge but in which the ink tank and the nozzles of the discharge head are divided for cyan, magenta, yellow and black inks.

Such two cartridges, same in shape but respectively designed for monochromatic and color functions, are already known in the field of ink jet printers, and the construction of the recording unit in the present embodiment, utilizing plurality of such existing cartridges, is advantageous for the manufacturing cost of the apparatus.

Each of the above-mentioned two cartridges is capable of supplying an electrical identification signal to the flexible cable, so that the printer control unit 7-1 can identify, by switching the switching signal 7-3 in succession, whether each of the cartridges A, B shown in FIG. 8 is a monochromatic or color cartridge.

Figure 9:
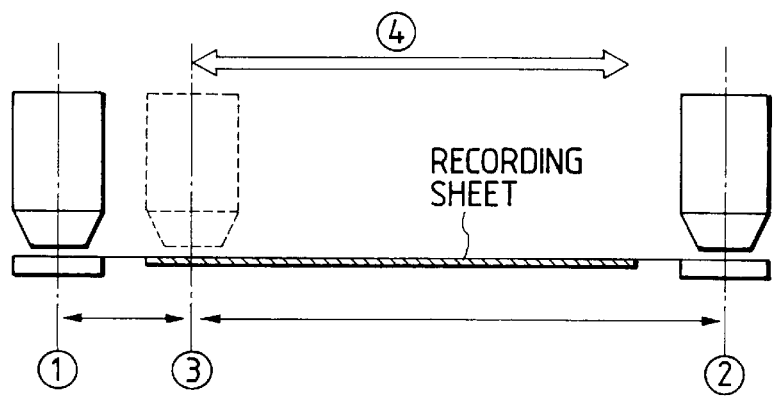
FIG. 9 is an elevation view showing the relation of positions of the cartridge shown in FIG. 8.

In the following there will be explained, with reference to FIG. 9, the function of each cartridge in the printer unit 1-12 of the present embodiment.

Normally the cartridges A, B are stored in the respective retraction positions. In case of recording with the cartridge A on the recording sheet, the stepping motor A is rotated by a predetermined number of pulses to move said cartridge A from the storage position (1) to a home position (3) for recording.

Subsequently the motor A is driven within a range (4), taking said home position as reference, for effecting recording operation in the main scanning direction of the recording sheet, which is advanced in combination. After the recording, the cartridge A is once returned to the position (3) and is then stored in the position (1).

Also the cartridge B is moved from the retraction position (2) to the home position (3), and effects recording in the range (4).

A table in FIG. 33 indicates the algorithm of lighting of the color indicator 3-8, depending on the status of the printer.

Figure 14:
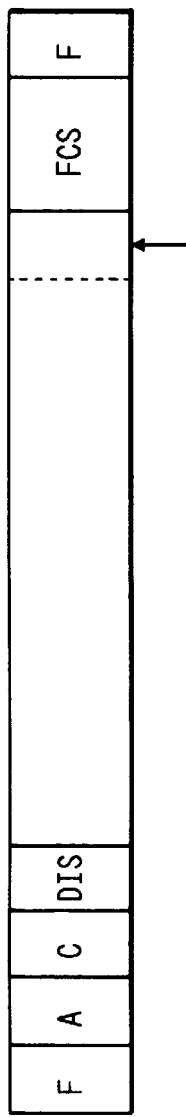
FIG. 14 is a chart showing an example of G3 transmission control protocol signal, shown in FIGS. 10 to 13, in the above-mentioned embodiment.
Figure 15:
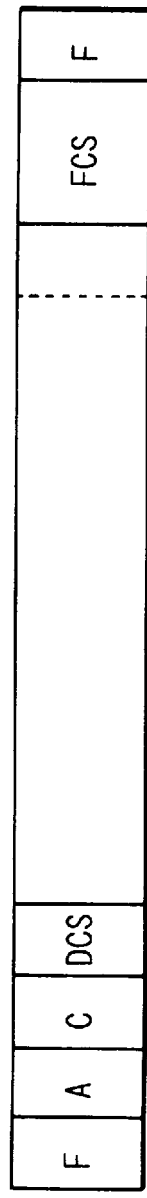
FIG. 15 is a chart showing another example of said G3 transmission control protocol signal.

Now reference is made to FIGS. 14 and 15 for explaining the full color expansion of the G3 transmission control protocol signal of the present embodiment.

A DIS signal shown in FIG. 14 sets a full color expansion area of 1 byte, for the DIS signal defined by the ITU-T recommendation T.30.

A bit 7 "different encodings in document" set at "1" and a bit 1 "JPEG color function" set at "1" in the expansion area indicate that the receiving side is capable of receiving a document containing a JPEG encoded full color page and an at least MH-encoded monochromatic page.

On the other hand, said bit 7 set at "0" indicates that the receiving side is incapable of receiving, within a single communication, an image page encoded by other than JPEG method.

A DCS signal shown in FIG. 15 sets a full color expansion area of 1 byte, for the DCS signal defined by the ITU-T recommendation T.30.

Figure 10:
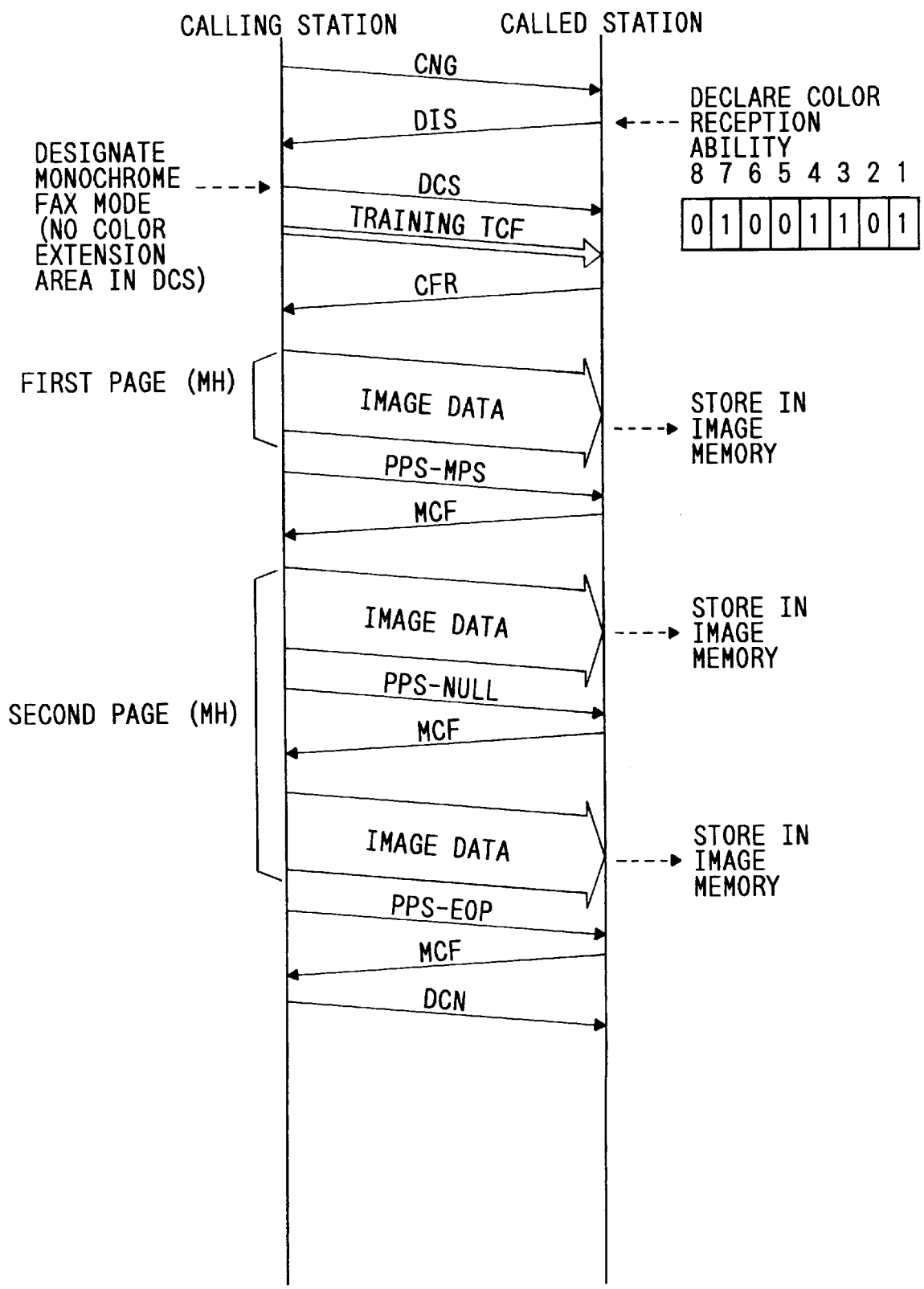
FIG. 10 is a sequence chart showing an example of protocol in the monochromatic image communication by the apparatus of the above-mentioned embodiment.
Figure 11:
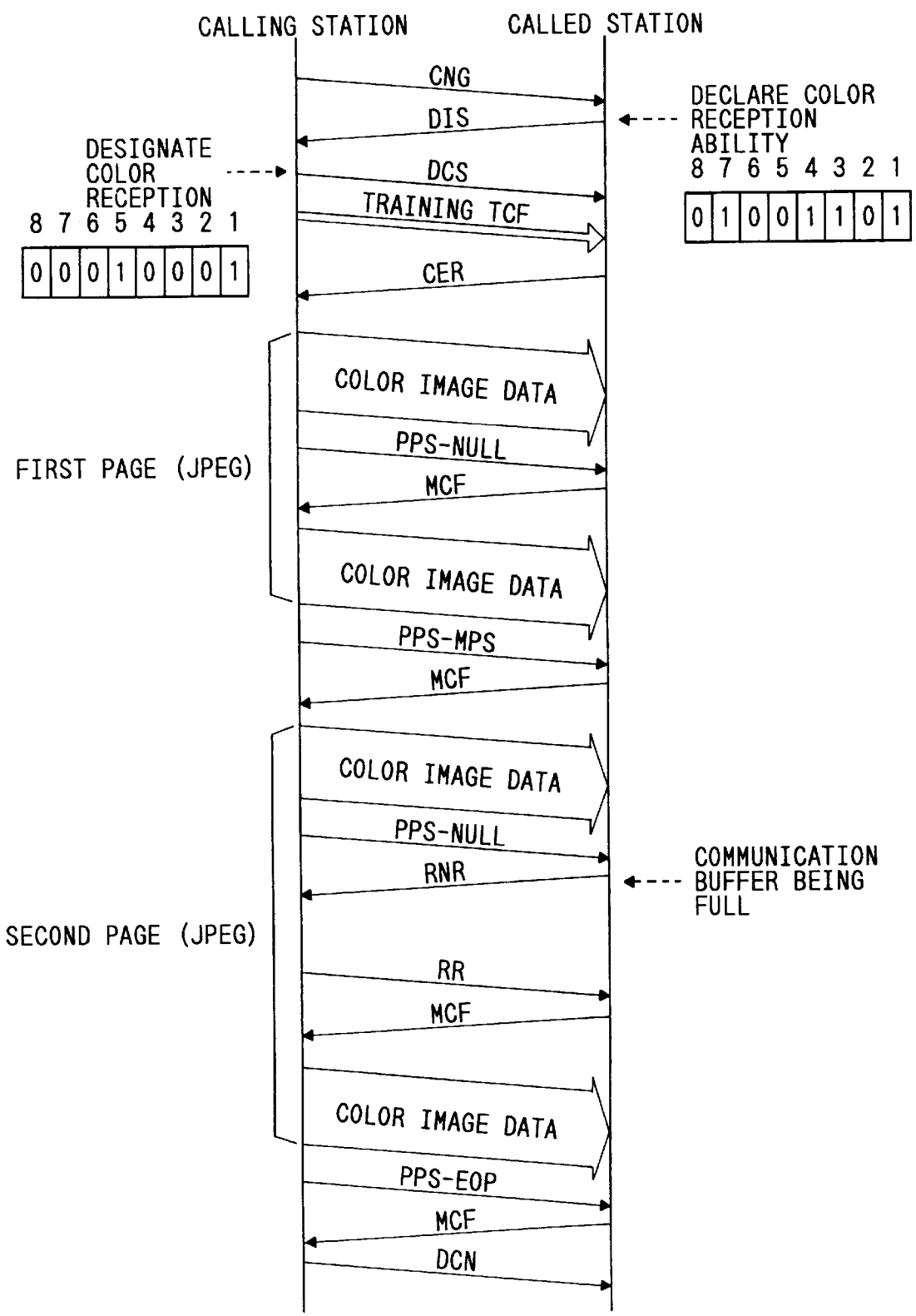
FIG. 11 is a sequence chart showing an example of protocol in the color image communication by the apparatus of the above-mentioned embodiment.

FIG. 10 illustrates an example of the protocal of an ordinary monochromatic communication, and FIG. 11 illustrates an example of the protocol of a color communication.

As a specific example, in case of transmitting ordinary monochromatic originals only in one communication, even if the receiving unit declares the presence of color capability, the transmission is made, as shown in FIG. 10, without addition of the above-mentioned color expansion area to DCS, whereby the receiving unit can detect the absence of transmission of a color page within the single communication.

The protocal shown in FIG. 10 shows a case in which all the transmitted images are once accumulated in the image memory prior to the MH encoding. The protocols shown in FIG. 10 are already well known in the G3 facsimile and will not, therefore, be explained in detail.

On the other hand, in case of transmitting, within the document to be transmitted, only the intermediate pages by color mode and the remaining pages by monochromatic mode, the transmission is made with the addition of the color expansion area to the initial DCS. In such case the bit 1 "use of JPEG function" in the expansion area is set at "0" (not used).

Upon DCS reception, the receiving unit can detect that (1) the initial page is monochromatic, but (2) a JPEG color page may be transmitted afterwards.

FIG. 11 shows a case in which all the pages contain color images, and the bit 1 of the color expansion area of the initial DCS is set at "1" (to be used).

Since all the pages are color, the receiving unit cannot use the image memory 1-9, and the data received by the communication buffer 4-4 are suitably transferred to the JPEG decoding circuit 5-3.

As already explained before, if the reception of the buffer 6-2 is completed while the data are still transferred from the other buffer 6-1, namely if the communication buffer becomes full, the RNR signal is returned to temporarily suspend the transmission.

Figure 12:
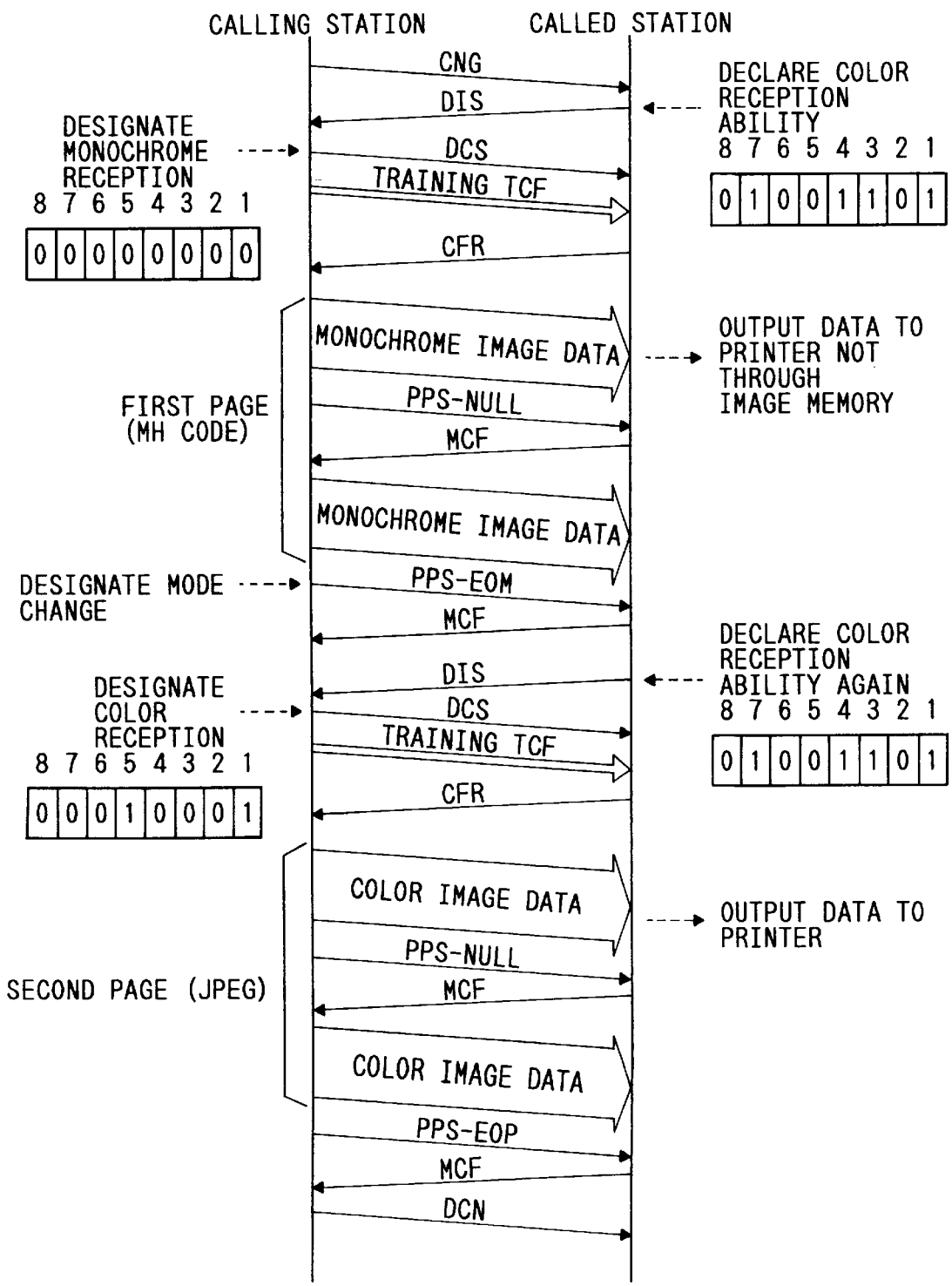
FIG. 12 is a sequence chart showing an example of protocol in the color/monochromatic mixed image communication by the apparatus of the above-mentioned embodiment.
Figure 13:
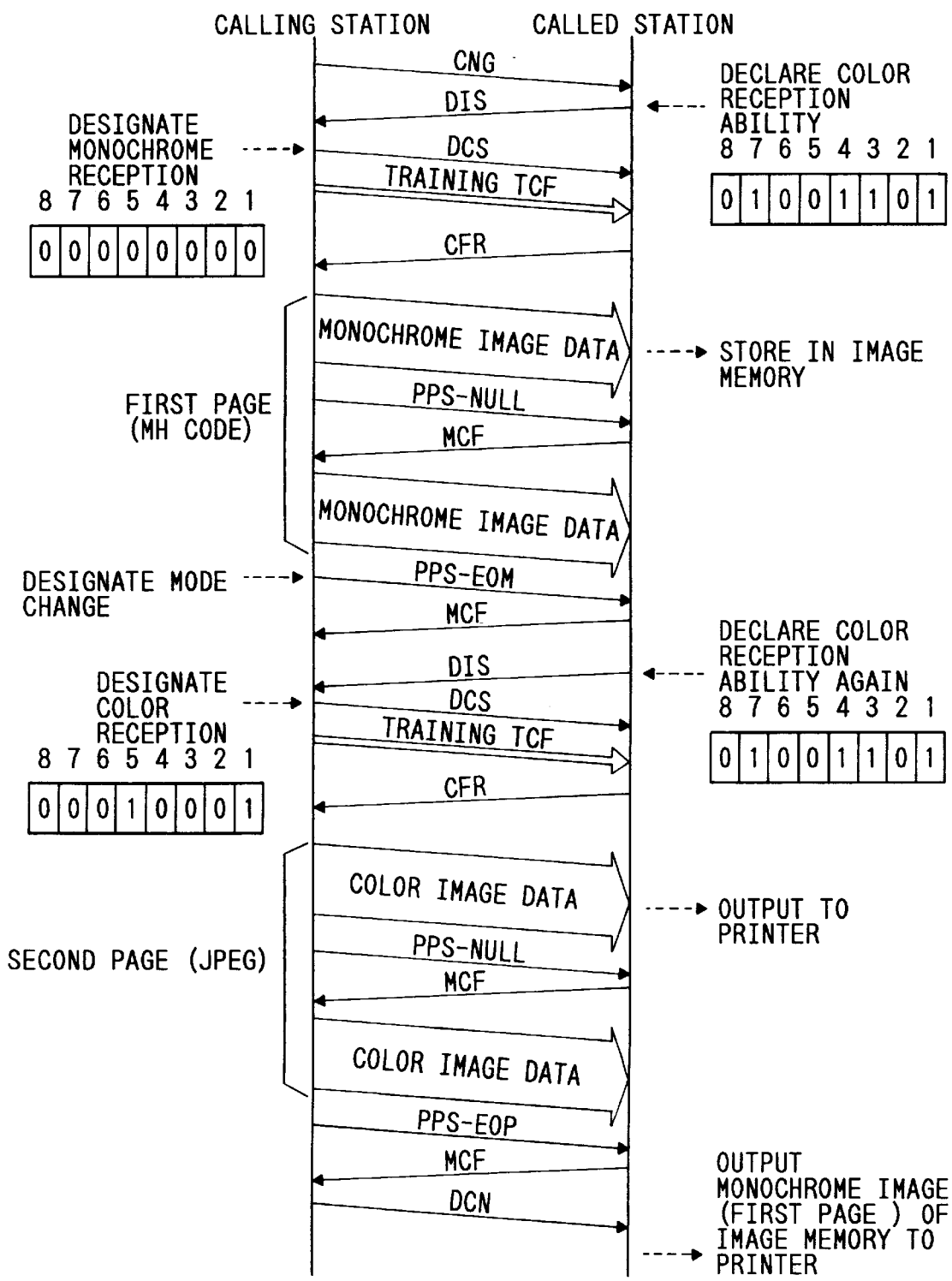
FIG. 13 is a sequence chart showing another example of protocol in such color/monochromatic mixed image communication.

FIGS. 12 and 13 show examples of communication sequence containing monochromatic pages and color pages in mixed manner.

FIG. 12 shows an example of the sequence in which the receiving unit detects the presence of the color expansion area in the initial DCS, thereby printing all the received pages directly without using the image memory 1-9.

Also FIG. 13 shows an example of the sequence in which the receiving unit stores all the monochromatic pages in the image memory 1-9 and printing thus stored monochromatic pages after the reception and recording of all the color pages are completed.

In the sequences shown in FIGS. 12 and 13, the color expansion area is added to the initial DCS, but the bit 1 thereof is set at "0", and a mode change is indicated by PPS-EOM immediately before the transmission of a color page. When said mode change is indicated, the receiving side again declares the presence of color receiving capability, and the transmitting side sets the bit 1 of the color expansion area at "1" in the next DCS.

Figure 16:
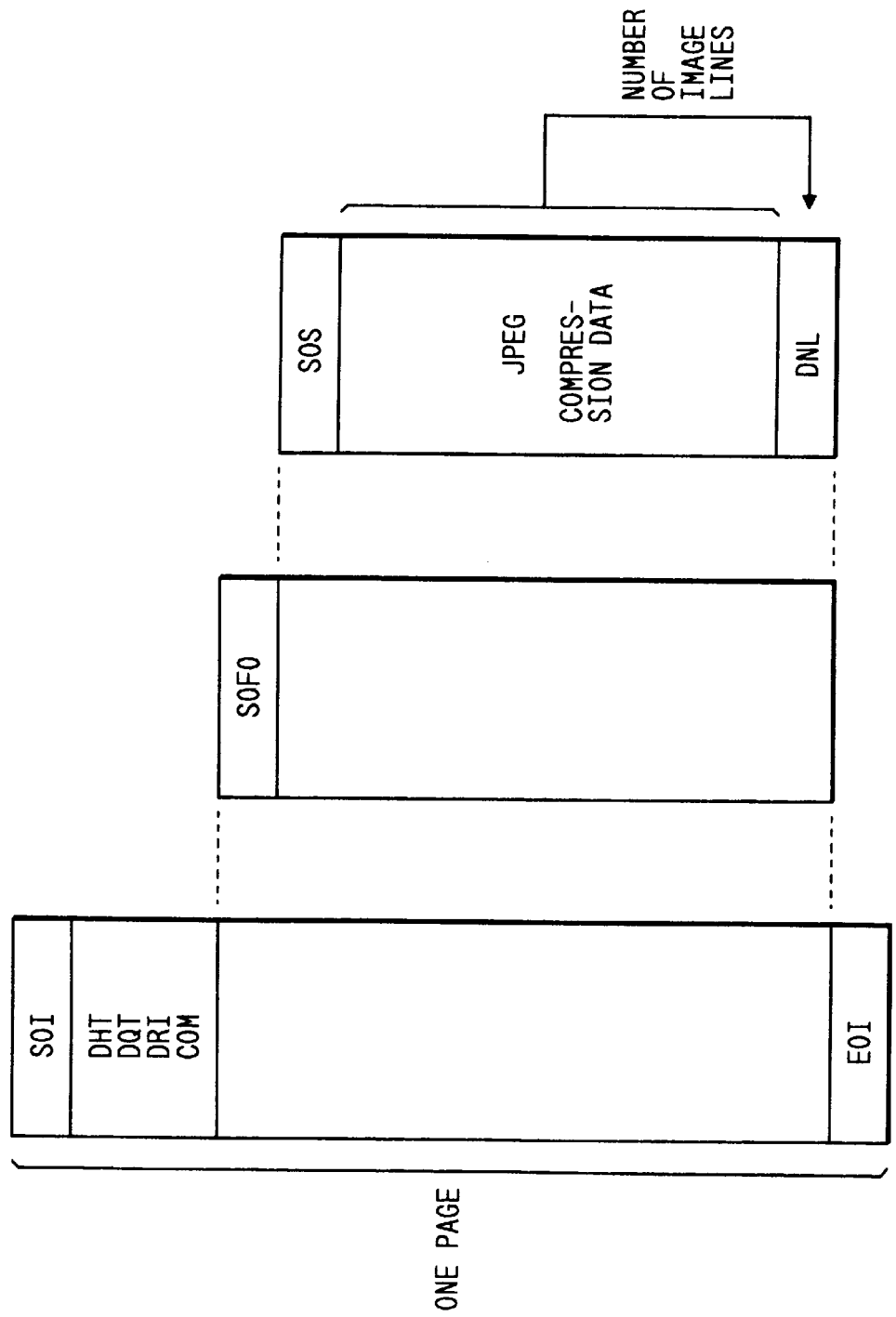
FIG. 16 is a schematic view showing the data structure of JPEG baseline encoding data to be transmitted as color image information in the apparatus of the above-mentioned embodiment.

FIG. 16 schematically shows the data structure of the JPEG baseline encoded data defined by the ITU-T recommendation.

Data of a page are composed of an image frame, sandwiched between SOI and EOI markets. After the SOI marker, the image frame contains various parameters associated with the marker code as shown in FIG. 34, and a baseline frame starting with $SOF_0$. Said baseline frame contains a scan frame starting with a SOS marker, and said scan frame contains JPEG-encoded compressed image data.

Figure 17:
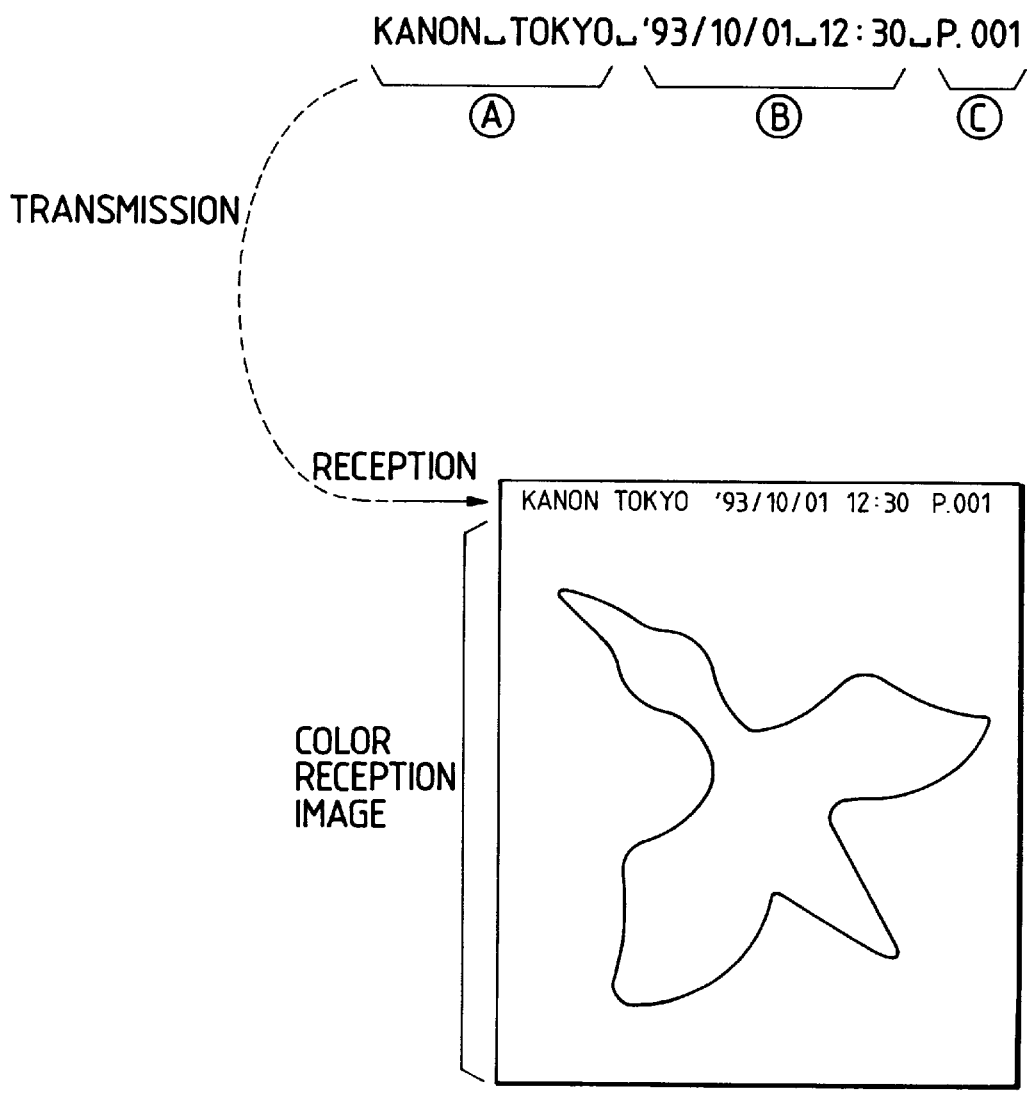
FIG. 17 is a schematic view showing the content of preparation of page header information to COM marker parameters in the apparatus of the above-mentioned embodiment.

FIG. 17 is a schematic view showing the content of the page header information for the comment (COM) marker parameters in the present embodiment.

In the monochromatic G3 facsimile, page header information, containing for example the ID information of the transmitting unit, calendar information, page number etc., is usually formed as an image in the transmitting unit and is transmitted by addition to the image of a transmitted page. In this manner said page header information can be conveniently reproduced in the received image.

However, if the header information is formed as an image as in the case of monochromatic facsimile, attached to the transmitted image and JPEG encoded, such page header information may be deteriorated in quality and become illegible at the receiving side, because the JPEG baseline encoding is an irreversible encoding not ensuring faithful reproduction of the original image, and because the deterioration in image quality is significant for characters.

In the present embodiment, therefore, only in case of transmission of a color page, character information as shown in FIG. 17 is prepared as the parameters of the COM marker in the JPEG data and transmitted to the receiving unit.

In FIG. 17, (A) stands for the abbreviated name of the transmitting unit; (B) is the calendar information read from the clock unit; and (C) indicates the page number. The receiving unit, having received a color page, prints the character information of the COM marker on the recording sheet at the recording of the received image, thereby providing header information easily recognizable by the user, as in the page header of the received monochromatic page.

Figure 18:
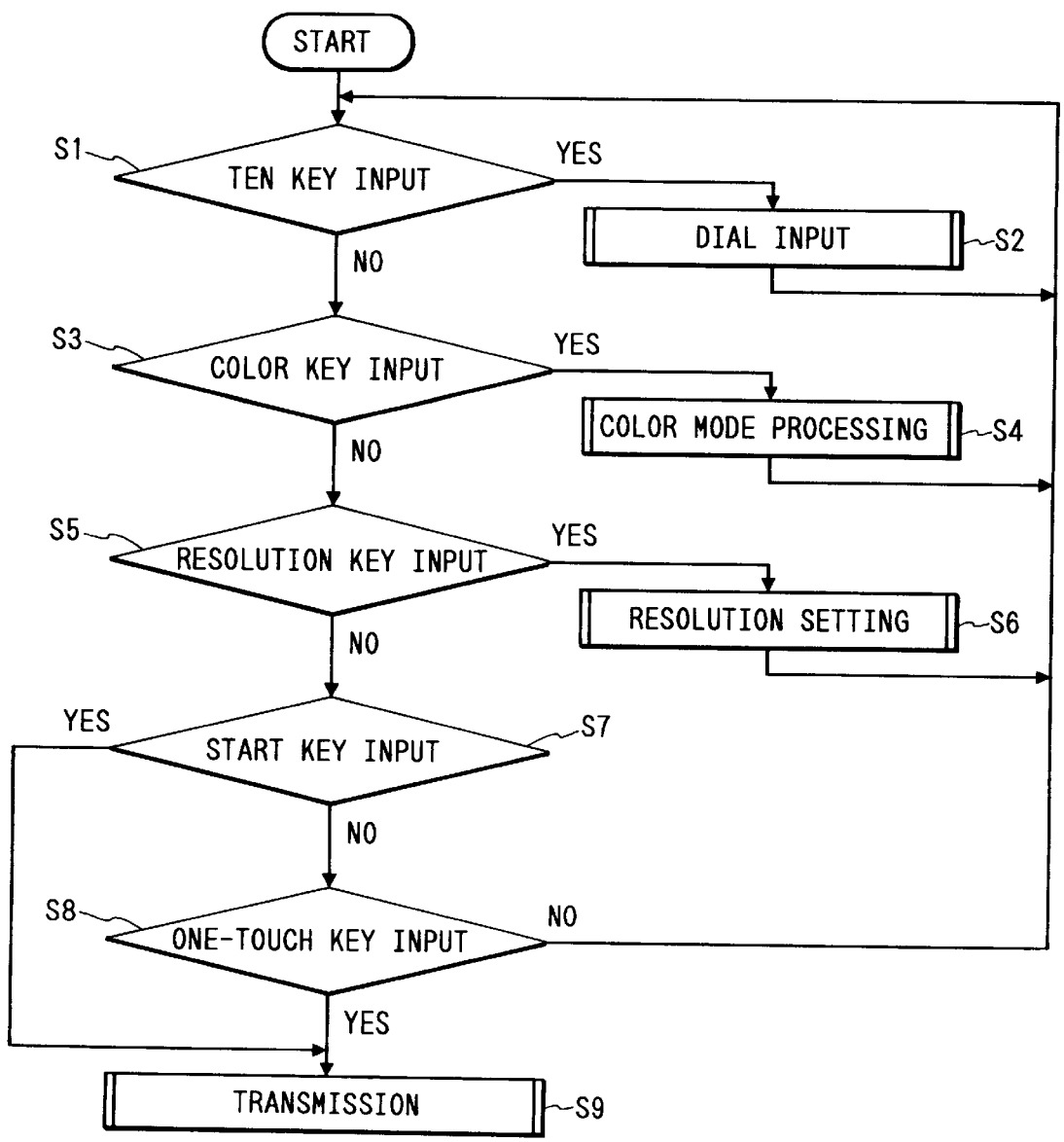
FIG. 18 is a flow chart showing the operation sequence in the transmission by the apparatus of the above-mentioned embodiment.

FIG. 18 is a flow chart showing the operation sequence of the transmitting operation. The details of said sequence, in case of color transmission, are shown in FIGS. 21 and 23 to 26, and, in case of ordinary monochromatic transmission, in FIGS. 21 and 22.

Referring to FIG. 18, at first an address telephone number is entered by the numeral keys 3-1 (S1) and registered in the RAM 1-3 (S2), and the transmitting operation is subsequently initiated by the depression of the start key 3-4 (S7). The transmission is similarly started by the depression of one of the one-touch keys 3-3 (S8).

Figure 22:
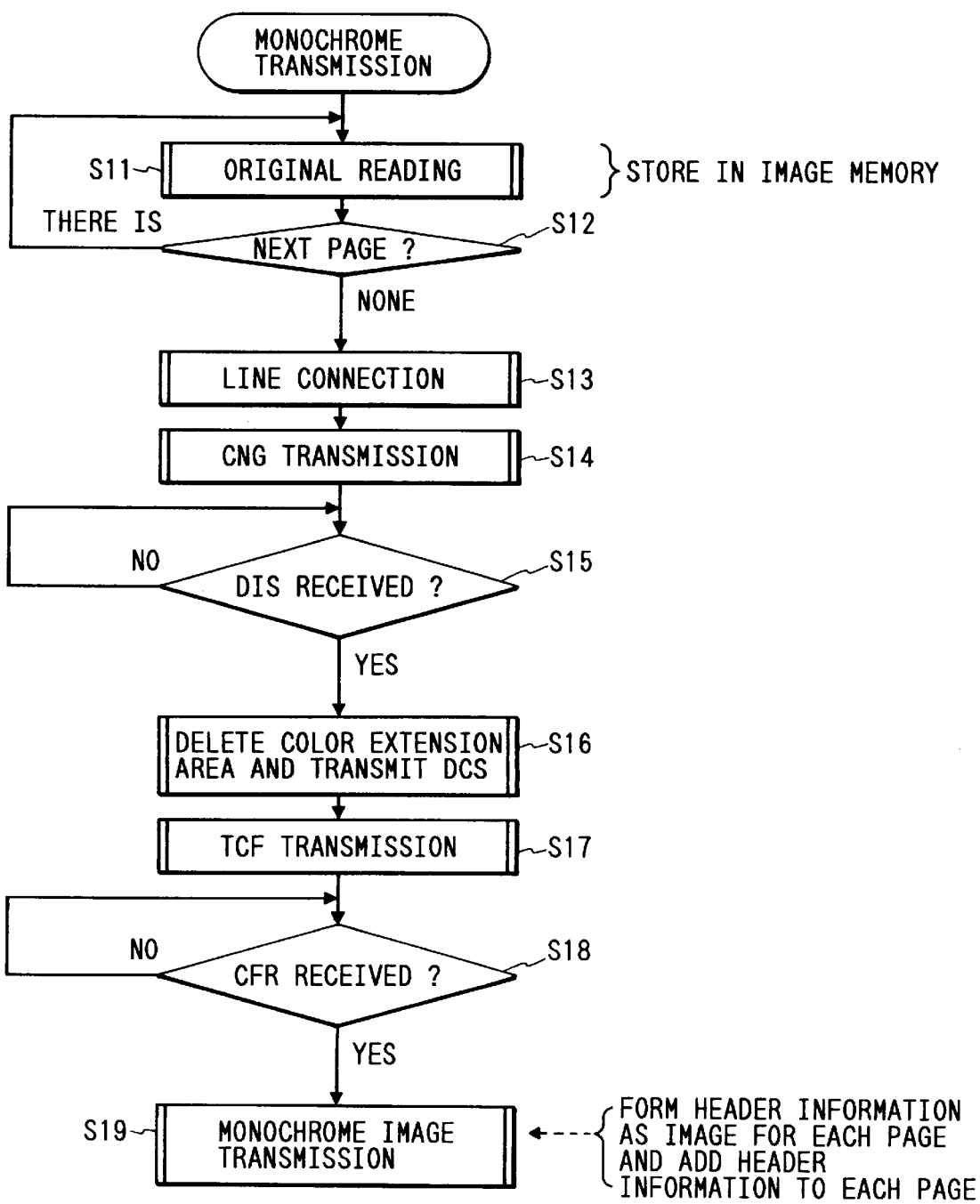
FIG. 22 is a flow chart of the monochromatic transmitting operation in the apparatus of the above-mentioned embodiment.

In case of ordinary monochromatic transmission, after the original image is accumulated in the image memory 1-9 as shown in FIG. 22 (S11, S12), the calling operation is conducted by reading the dialling number from the RAM (steps on and after S13).

In the sequence shown in FIG. 22, the original is at first read and accumulated in the image memory 1-9 (S11). If a next page is not present (S12), the calling operation is made with the dialling number stored in the RAM 1-3 (S13) to effect line connection, and CNG transmission is executed (S14). Upon DIS reception (S15), there is effected DCS transmission without the color expansion area, as explained above (S16). Then, after TCF transmission (S17) and upon CFR reception (S18), there is initiated the transmission of the monochromatic image (S19).

Figure 23:
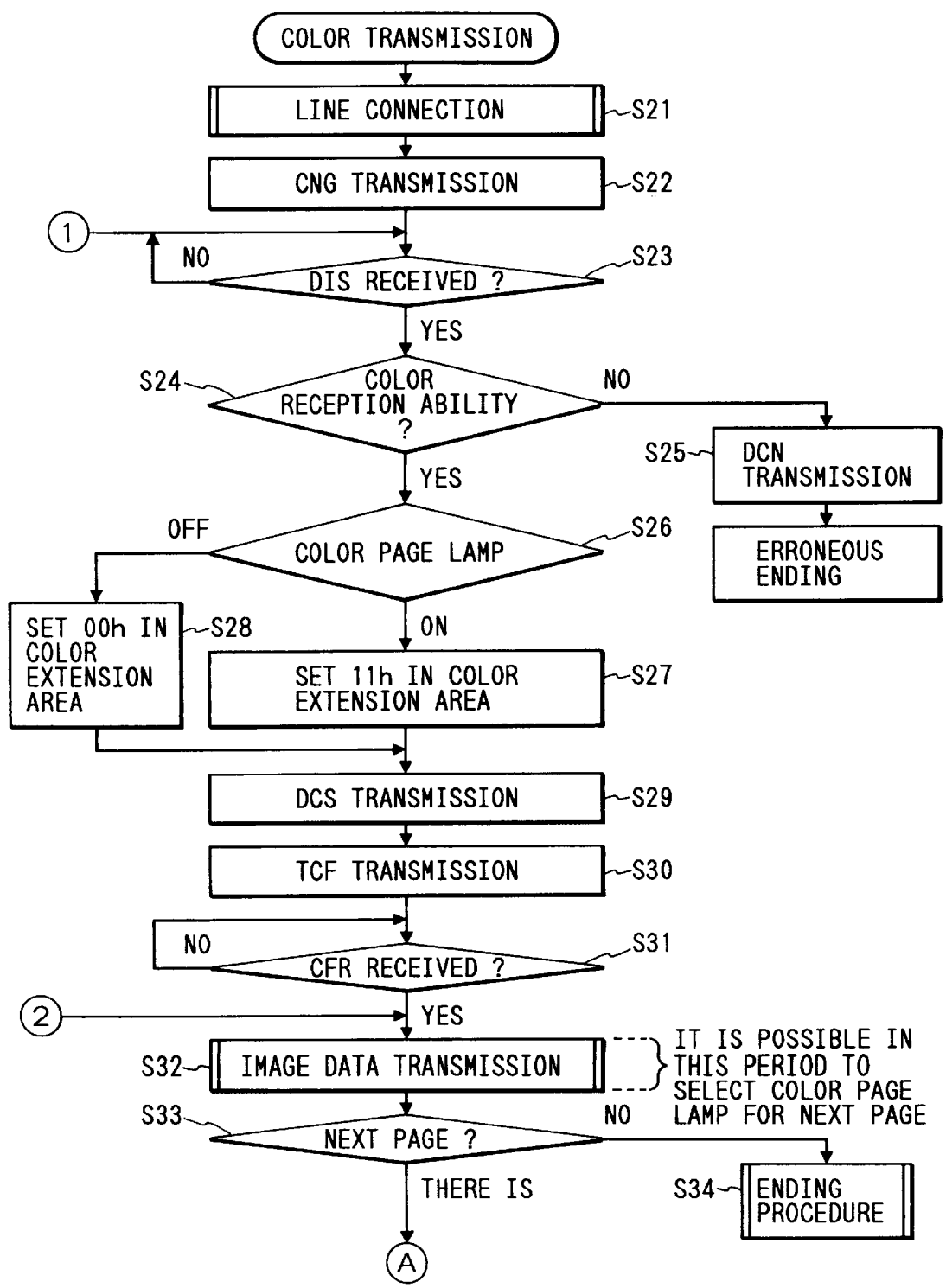
FIGS. 23 and 24 are flow charts of the color transmitting operation in the apparatus of the above-mentioned embodiment.
Figure 24:
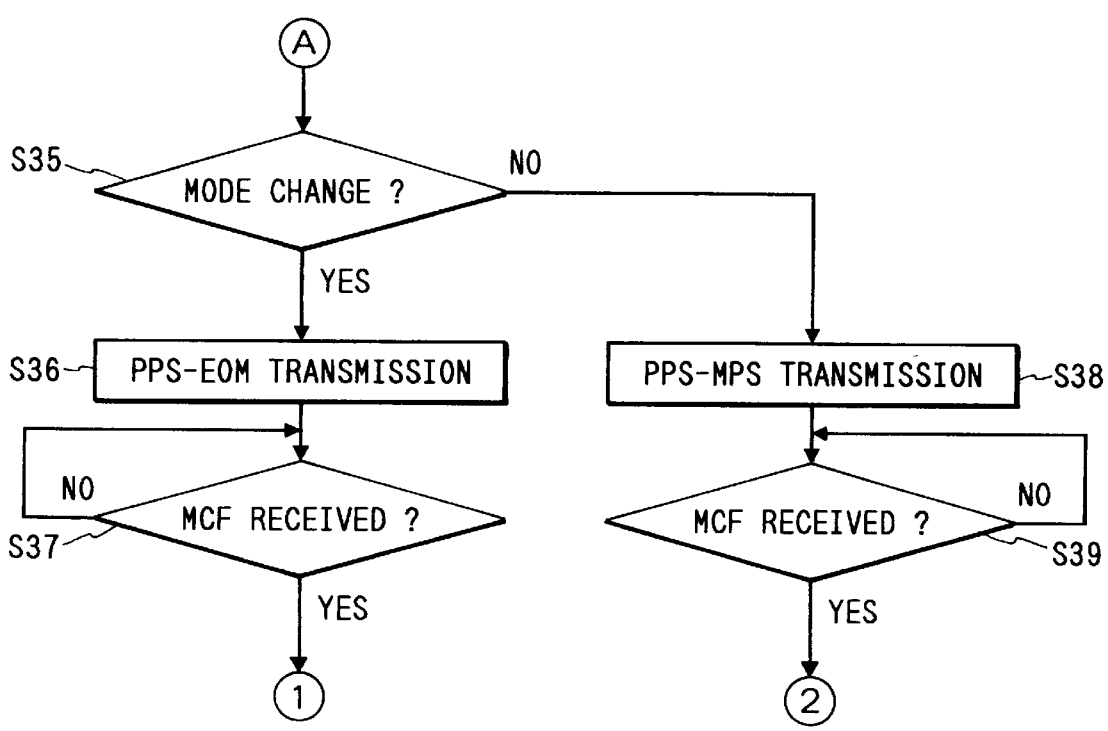

On the other hand, in case of color transmission, after the line connection by a calling operation (S21), the original reading is started (S32), as shown in FIG. 23.

Referring to FIG. 23, the line connection is made by a calling operation with the dialling number stored in the RAM 1-3 (S21), and CNG transmission is conducted (S22). Upon DIS reception (S23), there is discriminated the color receiving ability of the receiving unit (S24). If the color receiving ability is not available, DCN transmission is made (S23) and the sequence is terminated by an error state.

On the other hand, if the color receiving ability is available at the receiving unit, reference is made to a color page lamp to be explained later (S26), and, if it is turned off, $00_h$ is set in the color expansion area (S28), but, if it is turned on, $11_h$ is set in the color expansion area (S27).

Then there are executed DCS transmission (S29) and TCF transmission (S30), and, upon CFR reception (S31), there is initiated the image transmission of a page (S32). Thereafter, if the next page is not present (S33), the sequence proceeds to an ending protocol (S34), but if the next page is present, there is discriminated, in the sequence shown in FIG. 24, whether a mode change still exists (S35). If the mode change is present, there is conducted PPS-EOM transmission (S36), and, after MCF reception (S37), the sequence returns to the step S23. In case of absence of the mode change, there is conducted PPS-MPS transmission (S38), and, after MCF reception (S39), the sequence returns to the step S32.

Figure 21:
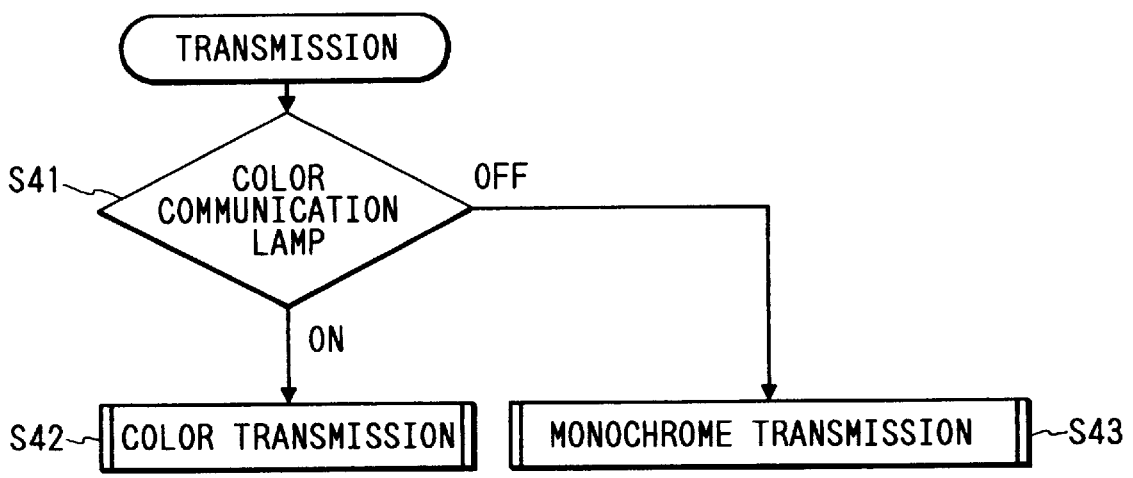
FIG. 21 is a flow chart showing the selecting operation for the color transmission and the monochromatic transmission in the apparatus of the above-mentioned embodiment.

Also in the transmission in the step S9, there is checked the status of a color communication lamp, to be explained later, (S41) as shown in FIG. 21, and, if said lamp is turned on, the sequence proceeds to a color transmitting operation (S42), but, if said lamp is turned off, the sequence proceeds to a monochromatic transmitting operation (S43).

The one-touch keys 3-3 are respectively associated, in the RAM, with data tables, in which registered in advance are destination telephone numbers and parameters required for the transmission. Prior to the start of transmission, the operator can select the color mode (S3, S4) and the resolution (S5, S6).

Figure 19:
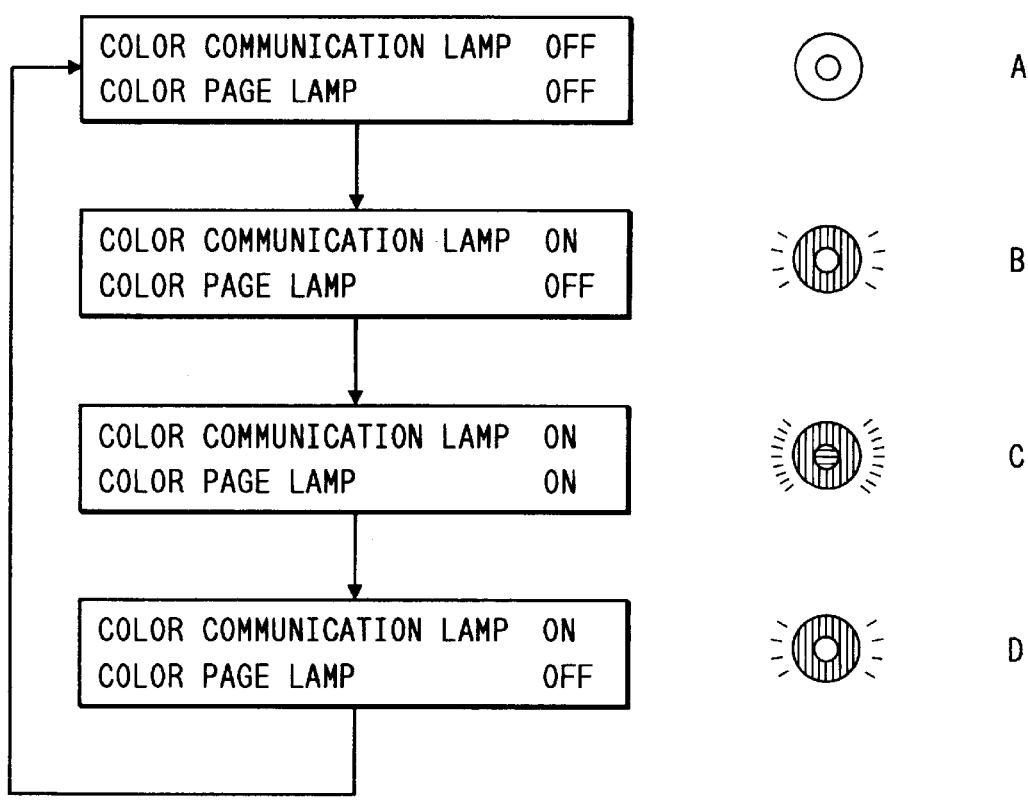
FIG. 19 is a view showing the states of a color communication lamp and a color page lamp in the apparatus of the above-mentioned embodiment.

In the step S3 shown in FIG. 18, the color communication lamp at the outside of the color key 3-6 and the color page lamp 3-7 at the inside vary their states in response to depressions of the color key, as shown in FIG. 19. A state A in FIG. 19 indicates the aforementioned setting for the monochromatic transmission, while states B, C and D indicate the setting states for color transmission.

The states B and D are set in case color transmission is conducted in a certain page within a communication, but the first page is monochromatic. Also the state C is set in case color transmission is conducted within a communication and the first page is also a color page.

Figure 25:
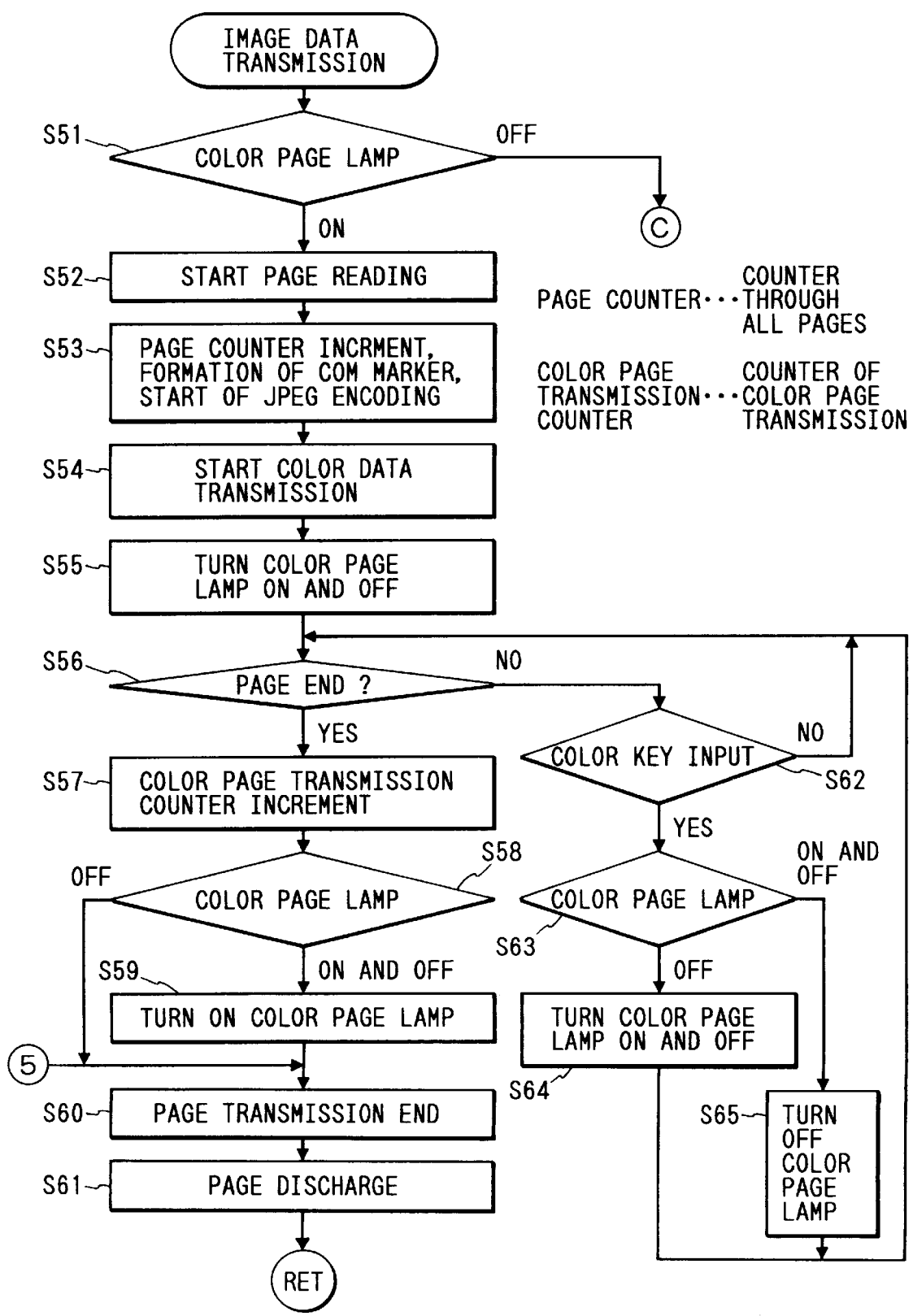
FIGS. 25 and 26 are flow charts showing the details of the image data transmission in the apparatus of the above-mentioned embodiment.
Figure 26:
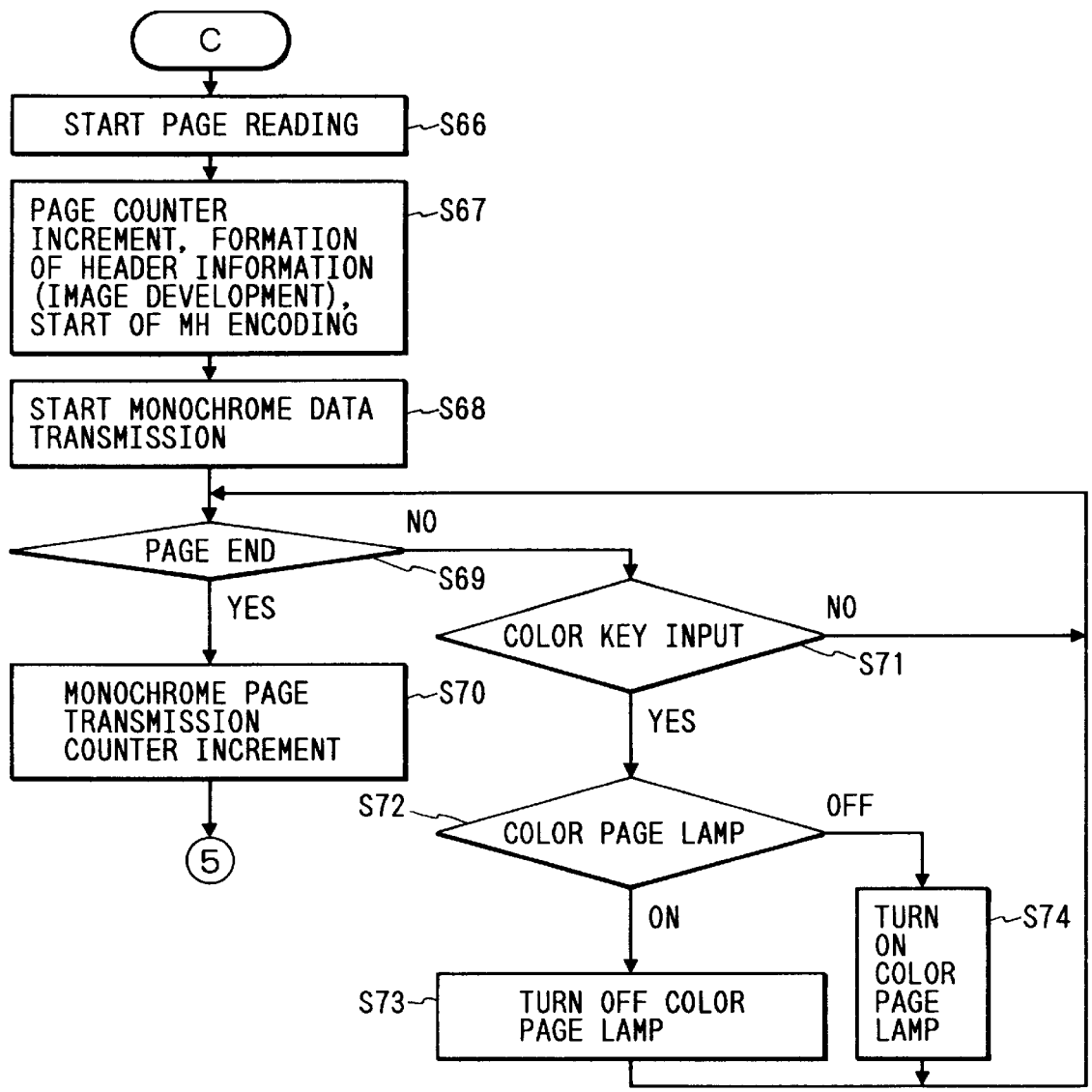

As shown in FIGS. 25 and 26, in the course of page transmission in the state B, C or D shown in FIG. 19, the state of the lamps varies between the states B and C (or between C and D) in response to the depressions of the color key 3-6, in order to enable selection, for each page, whether the next page is to be transmitted in the color mode or in the monochromatic mode.

FIG. 20 shows the state changes in the resolution lamps (super fine and fine) in response to the depressions of the resolution key in the step S5 shown in FIG. 18. In the present embodiment, for the monochromatic page, the image reading resolution varies depending on the super fine mode, fine mode or normal mode (in which both lamps are turned off), but, for the color page, the resolution remains constant but the content of the quantizing table for JPEG encoding is varied. For this reason plural quantizing tables are registered in advance in the ROM 1-2 and are suitably selected at the JPEG encoding, and the content of the selected quantizing table is transmitted, as shown in FIGS. 16 and 17, as a parameter of the DQT marker to the partner terminal.

Referring to the flow chart shown in FIG. 25, the state of the color page lamp is checked at first (S51), and, if it is turned on, the page reading operation is started (S52) and the count of a through page counter is increased by one (S53). Then the color data transmission is started (S54), and the color page lamp is made to intermittently flash (S55).

Then the color key entry is accepted (S62) until the page end is detected in a step S56, and the state of the color page lamp is switched thereafter (S63–S65).

Also when the page end is identified in the step S56, the count of a color page transmission counter, for counting the number of transmitted color pages, is increased by one (S57). Then the state of the color page lamp is checked (S58), and, if it is intermittently flashing, it is turned on continuously (S59), but, if it is turned off, the page transmission is terminated (S60). Then the sequence returns after the discharge of the original of said page (S61).

On the other hand, if the step S51 identifies that the color page lamp is turned off, there is started the page reading operation (S66), and, after the increment of the through page counter, preparation of the header information (image development) and start of MH encoding (S67), there is initiated the transmission of the monochromatic data (S68).

Then, until the page end is detected in a step S69, the color key entry is accepted (S71) and the state of the color page lamp is switched (S72–S74).

Also when the step S69 identifies the page end, the count of a monochromatic page transmission counter, for counting the number of transmitted monochromatic pages, is increased by one (S70) and the sequence proceeds to the step S60.

FIG. 32 is a plan view showing the transition of the display of the page counter in the above-explained transmitting operation. As shown in FIG. 32, there are displayed the numbers of entire pages, monochromatic pages and color pages, and the color communication lamp at the outside of the color key 3-6 is turned on at the color transmission while to color page lamp 3-7 at the inside is turned on at the transmission of a color page.

In the following there will be explained, with reference to FIGS. 27 to 29, the receiving operation of the present embodiment.

Figure 27:
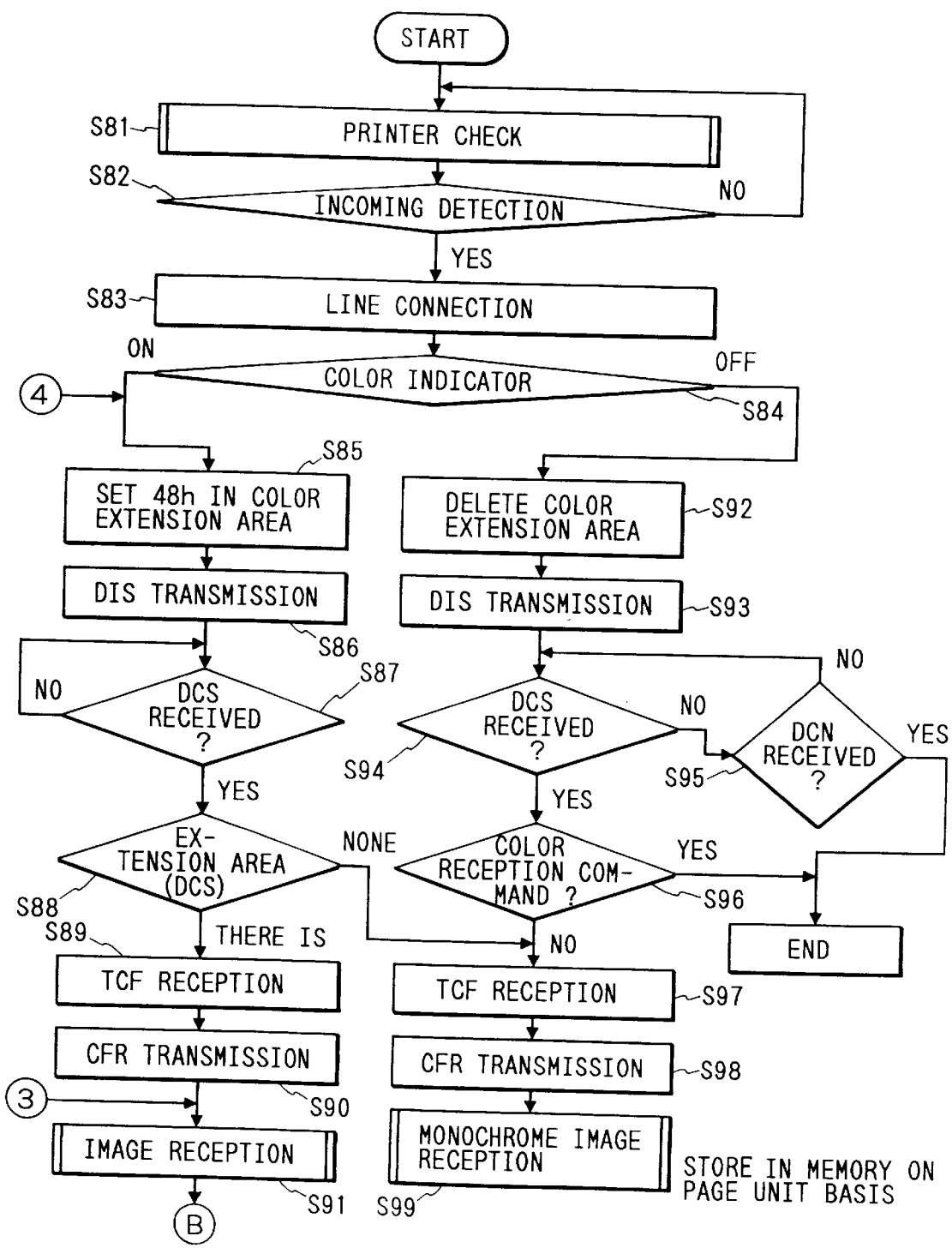
FIGS. 27 and 28 are flow charts showing the receiving operation in the apparatus of the above-mentioned embodiment.

Referring to FIG. 27, in the stand-by state, there are conducted (S81) detection of the incoming call and check of the printer 1-12. In said checking operation, there are confirmed the mounting state of plural cartridges, presence of ink in the mounted cartridges, mounting state of the recording sheet cassettes and presence of the recording sheets in said cassettes, and these states are memorized in succession in the RAM 1-3, while an incoming call signal (CI) from the NCU 1-6 is detected (S82).

Upon detection of the incoming call, the line is connected (S83), and a response signal DIS to the partner terminal is transmitted (S84). In this DIS transmission, the color indicator 3-8 is turned on by the logic shown in FIG. 33 if the printer 1-12 is capable of color recording (S84). Thus, in case the color indicator is turned on, the color expansion area of 1 byte shown in FIG. 14 is attached to DIS in the transmission (S85, S86), but, in case said color indicator is turned off, said expansion area is not attached to the DIS (S92, S93).

When DCS is returned from the partner unit in response to the above-mentioned DIS (S87, S94), there is checked the color expansion area of said DCS (S88, S96). If a DCS, instructing the color reception with the color expansion area is received in response to the DIS not containing the color expansion area (S96), the communication is interrupted and the sequence is terminated.

If a DCS instructing the ordinary monochromatic reception is received in response to the DIS, regardless of the presence or absence of the color expansion area, there is conducted the ordinary monochromatic image reception (S97–S99).

On the other hand, if the content of the DCS contains the expansion area, in response to the DIS declaring the color receiving ability by the addition of the above-mentioned color expansion area, there is conducted the image reception for color reception (S89–S91), in which mixed color and monochromatic pages can be received. The details of the image reception in the step S91 are shown in FIG. 29.

If the DCS instructs the color reception by the expansion area, the color page reception is conducted for the first page, but, if the color reception is not instructed even in case of a DCS containing the expansion area, the monochromatic page reception is conducted for the first page.

Figure 29:
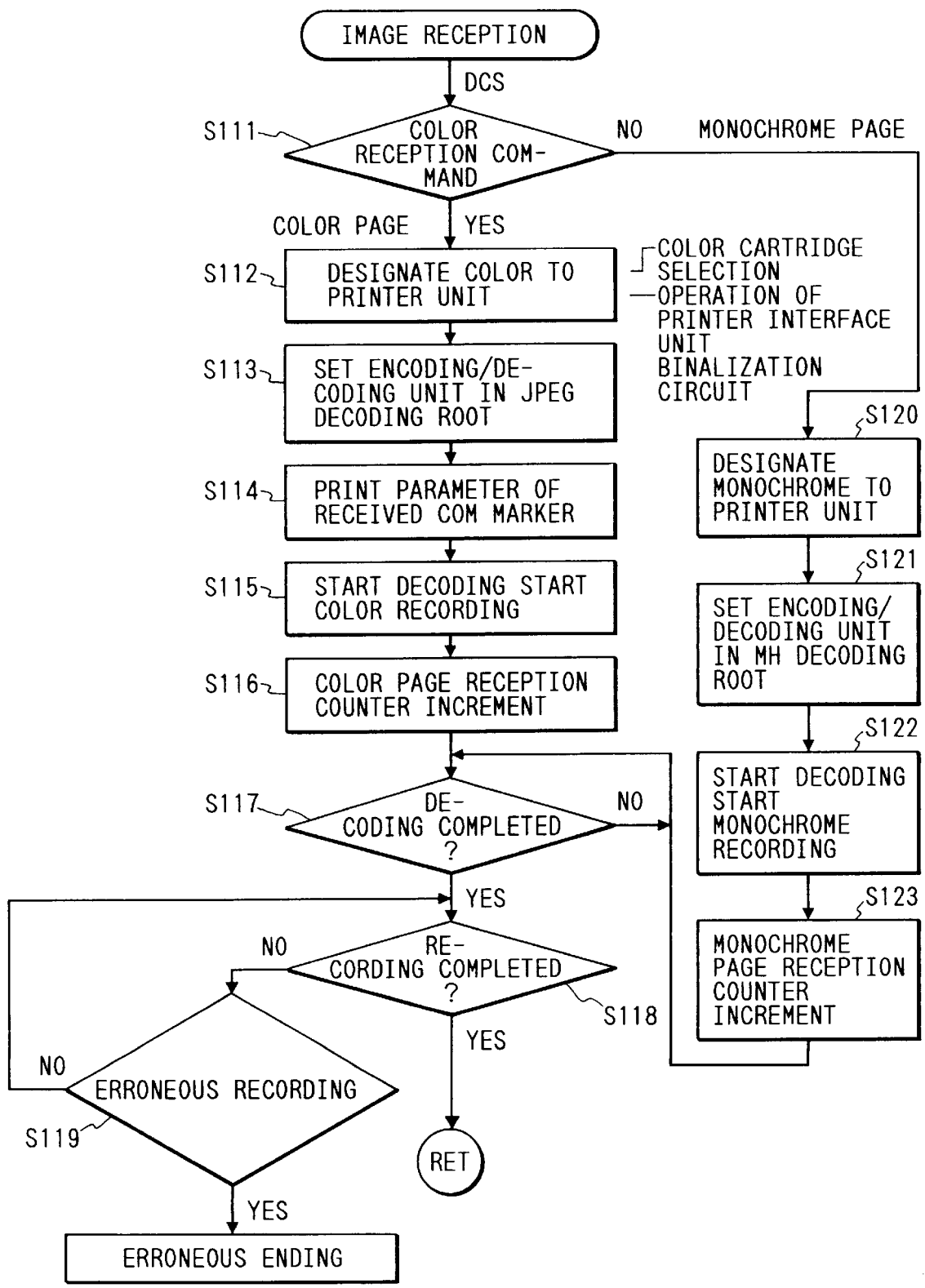
FIG. 29 is a flow chart showing the details of the image data reception by the apparatus of the above-mentioned embodiment.

FIG. 29 is a flow chart showing the receiving sequence for each page in the color communication.

At first there is discriminated whether a color reception command has been received (S111), and, if received, the color mode is instructed to the printer 1-12 (S112). Then the encode/decode unit 1-4 is set at the JPEG decoding route (S113), then the parameters of the received COM marker are printed (S114), and the color recording is started by the decoding operation (S115).

Subsequently an increment of the color page reception counter is conducted (S116), and the sequence returns upon completion of decoding (S117), and completion of recording (S118). Also in case of an abnormality prior to the completion of the recording (S119), the sequence is terminated.

On the other hand, the step S111 instructs monochromatic page reception, the monochromatic mode is instructed to the printer 1-12 (S120), then the encode/decode unit 1-4 is set at the MH decoding route (S121), and the decoding operation is started for monochromatic recording (S122). Then there is conducted an increment of the monochromatic page reception counter (S123), and the sequence proceeds to the step S117.

Figure 28:
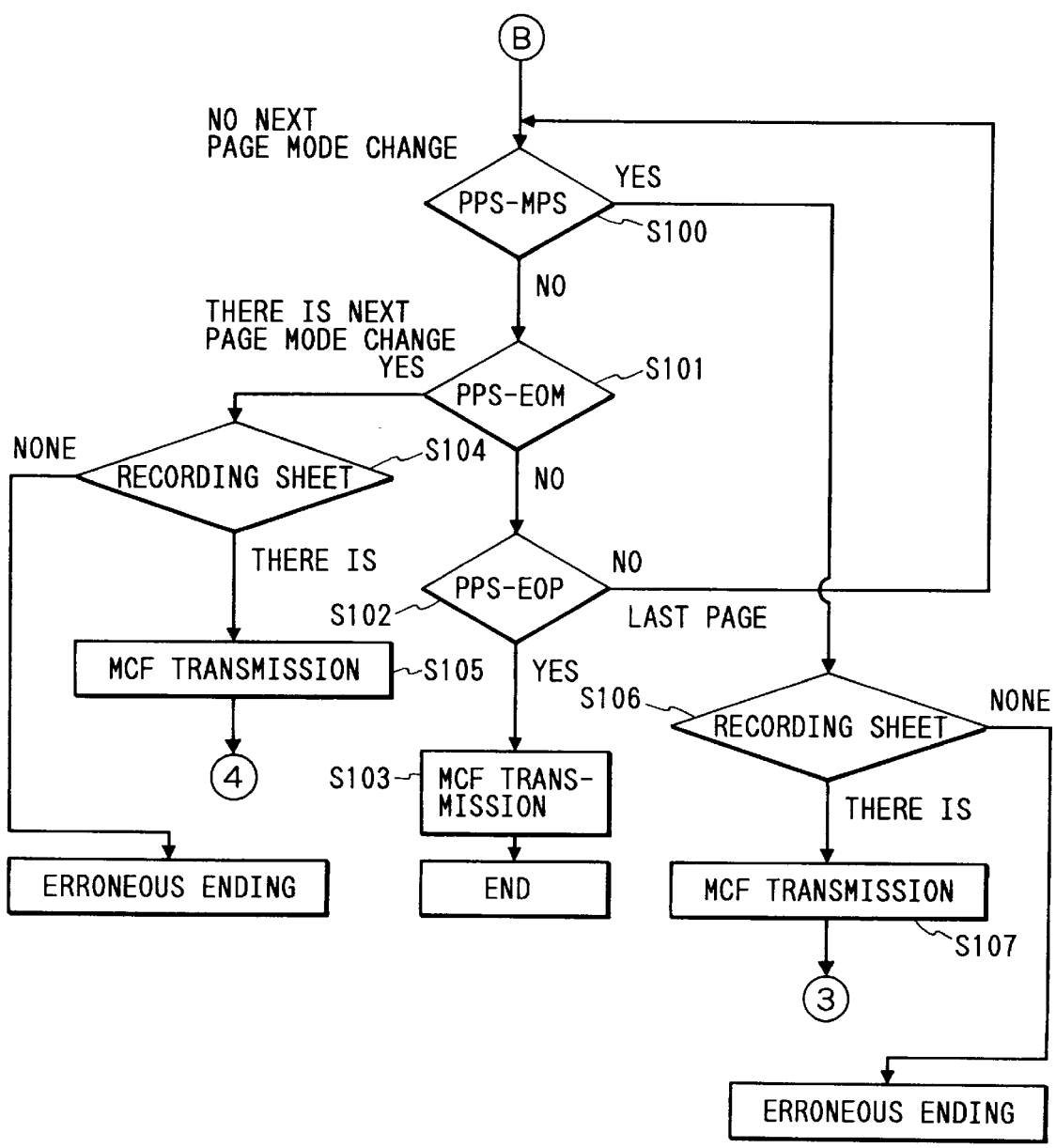

If a next page is present after the image reception of each page in the above-explained manner, the sequence proceeds to the flow chart shown in FIG. 28. If a PPS-MPS indicating the absence of the mode change is received (S100), and if the recording sheet is present (S106), an MCF is transmitted (S107) and the sequence returns to the step S91. If the recording sheet is absent (S106), the sequence is terminated for error.

On the other hand, if a PPS-EOM is received (S101), and if the recording sheet is present (S104), an MCF is transmitted (S105) and the sequence returns to the step S85. If the recording sheet is absent (S104), the sequence is terminated for error.

If a PPS-EOP, indicating the last page, is received (S102), an MCF is transmitted (S103) and the sequence is terminated.

Figure 30:
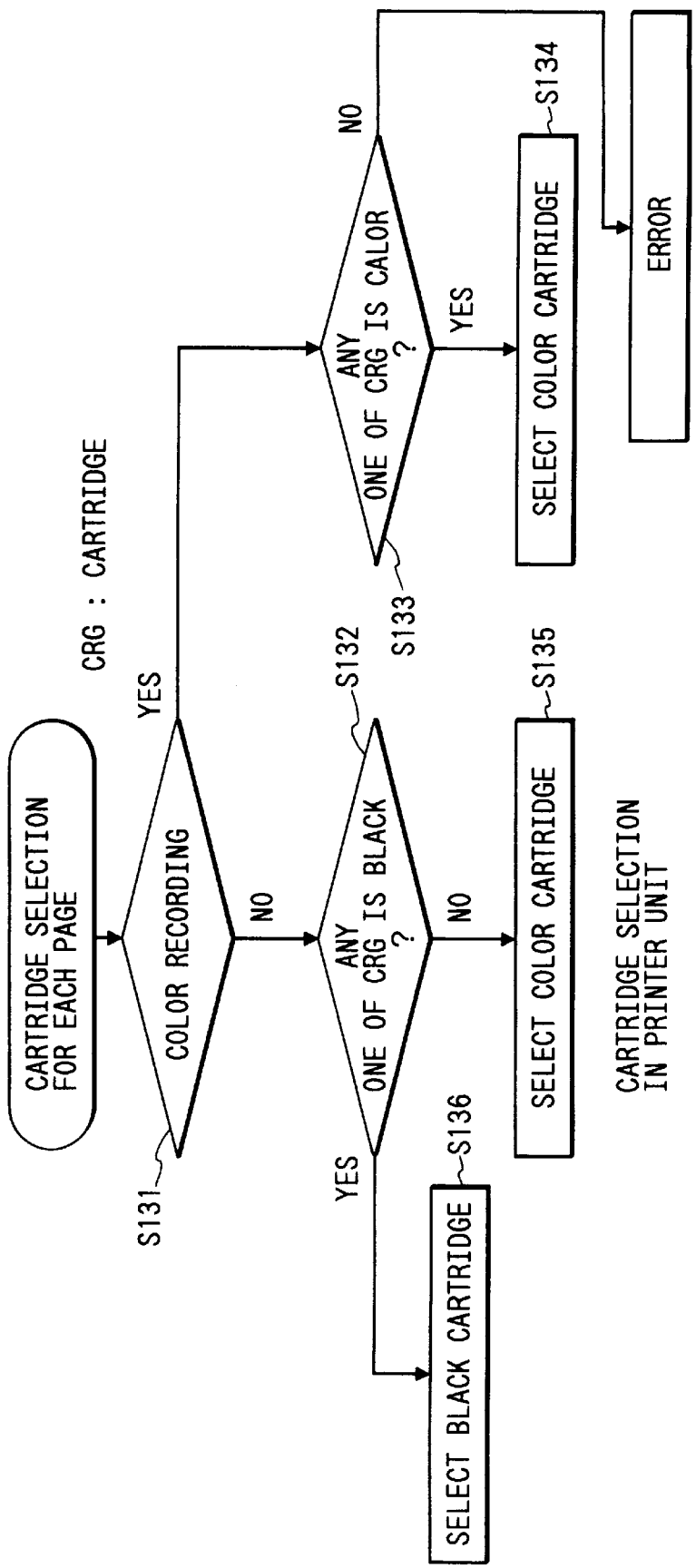
FIG. 30 is a flow chart showing the cartridge selecting operation in the apparatus of the above-mentioned embodiment.

FIG. 30 is a flow chart showing the cartridge selecting operation of the printer 1-12, to be executed by the control unit 1-1 for color/monochromatic designation to the printer 1-12 in the steps S111, S112 and S120 in FIG. 29.

At first there is discriminated whether the color recording or the monochromatic recording is selected (S131), and, in case of color recording if any of the cartridges is a color cartridge (S133), said color cartridge is selected (S134). Otherwise the sequence is terminated for error.

In case the step S131 identifies the monochromatic recording, if any of the cartridges is a monochromatic cartridge (S132), said monochromatic cartridge is selected (S136). Otherwise a color cartridge is selected (S135).

Figure 31:
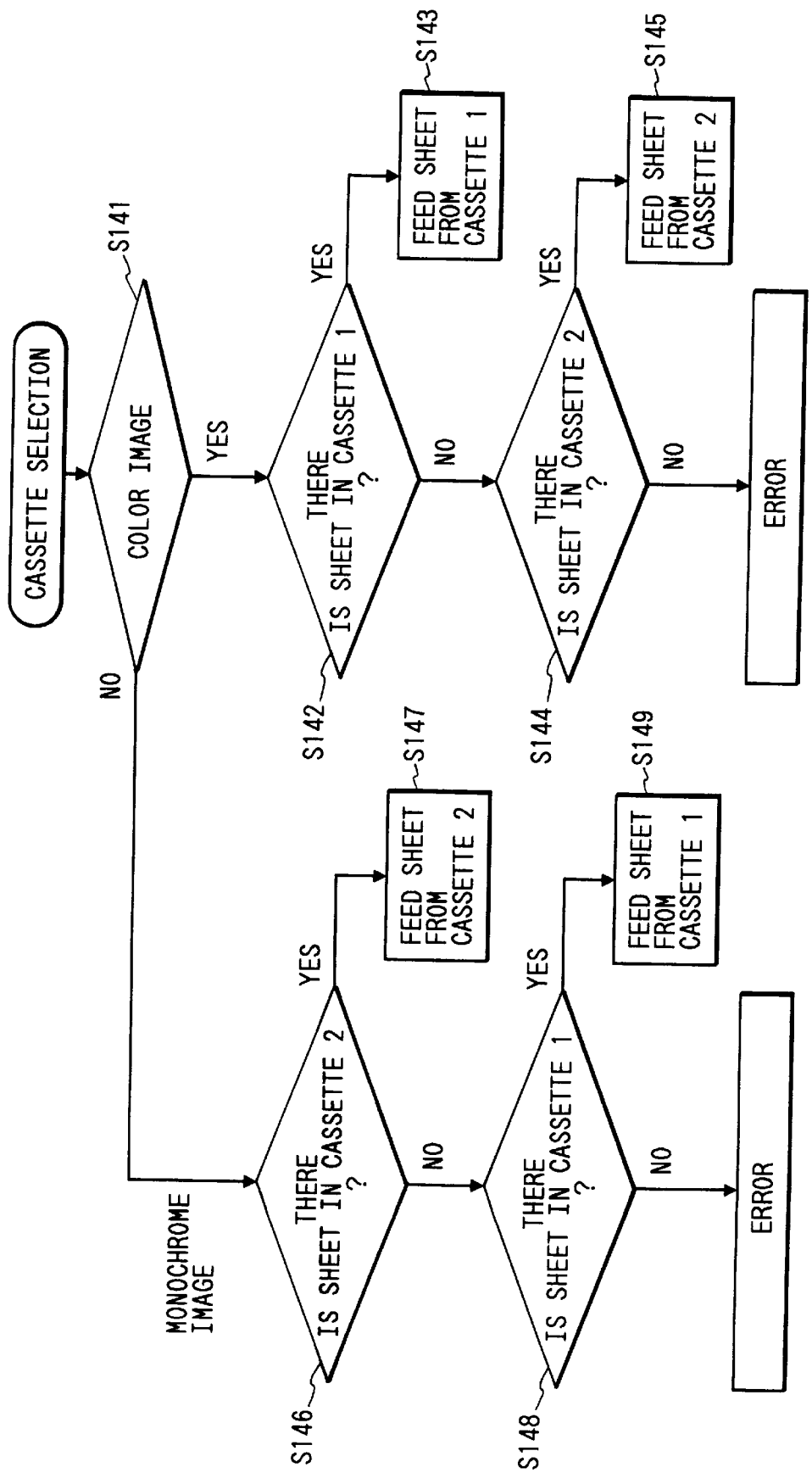
FIG. 31 is a flow chart showing the cassette selecting operation in the apparatus of the above-mentioned embodiment.

FIG. 31 is a flow chart showing the recording cassette selecting operation.

In the steps S111, S112 and S120 in FIG. 29, if the color recording is designated (S141), there may be employed a recording sheet exclusive for color recording or ink jet recording, in order not to deteriorate the quality of the recorded image. By setting such exclusive sheets in the cassette 1 and the ordinary sheets (for example for monochromatic copy sheet) in the cassette 2, the cassette 1 is preferentially selected in automatic manner in the color recording (S142–S145). Also the cassette 2 is preferentially selected in automatic manner in case the step S141 designates monochromatic recording (S146–S149).

The above-explained embodiment provides the following advantages:

1) Presence of the switching control means, for selecting either memory transmission control means for processing monochromatic images by storage in an image memory in the unit of a page in the monochromatic communication or direct transmission/reception control means for processing the image data without accumulation in said image memory in case of the color communication, avoids the use of a memory of a huge capacity in the color communication, thereby enabling to significantly reduce the manufacturing cost of the apparatus;

2) The printer connected with the control unit through an interface is composed of a control unit for the ink jet recording mechanism and plural ink cartridges, and is further provided with control means for either one of the plural cartridges in the printer. It is thus rendered possible to reduce the cost of the recording unit for monochromatic and color recording, also to prevent the increase in the electric power consumption and to achieve an increase in the ink capacity, not achievable with a single ink cartridge. Also the apparatus can be operated even in case any of the ink cartridges is inoperable for example because of lack of ink, by the selection of an operable cartridge;

3) The above-mentioned ink cartridge is constructed with a same shape for the color recording and for the monochromatic recording, so that the cartridges can be mounted in an arbitrary combination;

4) Use of plural recording sheet cassettes and cassette selection control means for employing different cassette selecting methods for the color image printing and the monochromatic image printing enables to select an optimum sheet for the color printing, thereby improving the image quality, and to select an ordinary sheet for the monochromatic printing thereby reducing the running cost;

5) Use of selection means for selecting the color mode or the monochromatic mode for each communication, and selection means capable, in case the color mode is selected by the first-mentioned selection means, of color transmission or monochromatic transmission for each page of the original, allows to improve the operation efficiency in the transmission of a document consisting solely of monochromatic pages and in the transmission of a mixed document containing monochromatic pages and color pages, and also to significantly improve the transmission efficiency because the monochromatic page need not unnecessarily be transmitted in the color mode;

6) The operation control means for employing a common operation method for designation of the resolution in the color original reading and in the monochromatic original reading includes means for switching the resolution in the reading of the monochromatic original but fixing the resolution and switching the quantizing table in the reading of the color original, thereby providing a visual effect of switching of the resolution without deterioration in the image quality of the color image;

7) Means for indicating, prior to the start of communication, presence of a page for color transmission in the document to be transmitted, and informing means to be activated in case the absence of color receiving ability is declared by the partner terminal in response to the instruction for color communication, allow to prevent unnecessary transmission such as automatic monochromatic transmission despite that color transmission is desired;

8) The operator can be relieved from the stress, since, within a document including the color communication, the execution of the instruction is visually displayed for the page in the color transmission;

9) Discrimination means and informing means for detecting the state of the printer and discriminating whether the color recording can be executed enable maintenance work in advance, such as ink replenishment;

10) Also in case the inability for color recording is identified, the absence of color receiving ability is informed to the partner terminal after the call therefrom, so that the erroneous transmission of the color image from said partner terminal can be avoided;

11) Means for adding the terminal ID, calendar information and transmitted page number to the comment marker in the JPED encoded data in the color page transmission, and means for recording such added information, significantly improve the legibility of the header information in the JPEG color image;

12) Use of a color expansion area in the standard signals DIS, DCS according to the ITU-T recommendation T.30 enables color communication not only between the apparatus of a same manufacturer but also between those of different manufacturers; and 13) Efficiency of maintenance is improved by means for individually counting the numbers of transmitted pages and received pages respectively of color pages and monochromatic pages.

In the above-explained embodiment, as explained in the foregoing, use of selection means for selecting color transmission or monochromatic transmission for each page of the original document can improve the operation efficiency in the transmission of a document consisting solely of monochromatic pages and a mixed document containing monochromatic pages and color pages. Also the transmission efficiency can be significantly improved since the monochromatic page need not be unnecessarily transmitted in the color mode.

What is claimed is:

1. An image communication apparatus comprising:

receiving means for receiving image data respectively representing a plurality of pages of at least one image, said receiving means further receiving control information representing whether the image data is color image data or monochromatic image data, wherein the control information is received by said receiving means at a time when the image data is switched between color image data and monochromatic image data;

discrimination means for discriminating, separately for each page and based on the control information, whether the image data representing that page is to be recorded as color image data or monochromatic image data;

selection means for selecting, for each page, one of a first recording medium supply unit and a second recording medium supply unit in accordance with a result of said discrimination means for that page;

recording means for recording the image data of each page on a recording medium supplied from the one of the first and second recording medium supply units selected by said selection means for that pages;

count means for separately counting a number of pages of the color image data recorded by said recording means and a number of pages of the monochromatic image data recorded by said recording means; and storage means for storing the numbers of pages obtained by said count means.

2. An apparatus according to claim 1, wherein said first recording medium supply unit contains a recording medium suitable for use in color image recording and said second recording medium supply unit contains a recording medium suitable for use in monochromatic image recording, said selection means selecting said first recording medium supply unit for one of the pages when said discrimination means discriminates that the image data for that one page is to be recorded as color image data and selecting said second recording medium supply unit for that one page when said discrimination means discriminates that the image data for that one page is to be recorded as monochromatic image data.

3. An apparatus according to claim 1, wherein when there is no recording medium in the recording medium supply unit selected by said selection means for one of the pages, said recording means records the image data for that one page on a recording medium supplied from another recording apparatus.

4. An apparatus according to claim 1, wherein said recording means records the image data for each page on the recording medium supplied from the recording medium supply unit selected for that page by ejecting ink onto the recording medium.

5. An apparatus according to claim 1, further comprising display means for displaying the numbers obtained by said count means.

6. An image communication method, comprising the steps of:

receiving image data respectively representing a plurality of pages of at least one image, said receiving step further receiving control information representing whether the image data is color image data or monochromatic image data, wherein the control information is received by said receiving step at a time when the image data is switched between color image data and monochromatic image data;

discriminating, separately for each page and based on the control information, whether the image data representing that page is to be recorded as color image data or monochromatic image data;

selecting, for each page, one of a first recording medium supply unit and a second recording medium supply unit in accordance with a result of said discriminating step for that page;

recording the image data of each page on a recording medium supplied from the one of the first and second recording medium supply units selected by said selecting step for that pages;

separately counting a number of pages of the color image data recorded in said recording step and a number of pages of the monochromatic image data recorded in said recording step; and storing the numbers of pages obtained in said counting means.

7. An image communication apparatus comprising:

receiving means for receiving image data respectively representing a plurality of pages of at least one image;

discrimination means for discriminating, separately for each page, whether the image data representing that page is to be recorded as color image data or monochromatic image data;

selection means for selecting, for each page, one of a first recording medium supply unit and a second recording medium supply unit in accordance with a result of said discrimination means for that page;

recording means for recording the image data of each page on a recording medium supplied from the one of the first and second recording medium supply units selected by said selection means for that page;

count means for separately counting a number of pages of the color image data recorded by said recording means and a number of pages of the monochromatic image data recorded by said recording means; and storage means for storing the numbers of pages obtained by said count means.

8. An image communication method, comprising the steps of:

receiving image data respectively representing a plurality of pages of at least one image;

discriminating, separately for each page, whether the image data representing that page is to be recorded as color image data or monochromatic image data;

selecting, for each page, one of a first recording medium supply unit and a second recording medium supply unit in accordance with a result of said discriminating step for that page;

recording the image data of each page on a recording medium supplied from the one of the first and second recording medium supply units selected by said selecting step for that page;

separately counting a number of pages of the color image data recorded in said recording step and a number of pages of the monochromatic image data recorded in said recording step; and storing the numbers of pages obtained in said counting means.

* * * * *

UNITED STATES PATENT AND TRADEMARK OFFICE
CERTIFICATE OF CORRECTION

PATENT NO. : 5,956,162

DATED : September 21, 1999

INVENTOR(S) : HIROSHI NOBUTA

Page 1 of 3

It is certified that error appears in the above-identified patent and that said Letters Patent is hereby corrected as shown below:

In the drawing:

SHEET 23

Figure 21, "INCRMENT" should read --INCREMENT--.

SHEET 31

Figure 33, "RAN" should read --RUN--.

COLUMN 1

Line 61, "of that of" should read --that of--.

COLUMN 5

Line 19, "a pages" should read --pages--.

COLUMN 8

Line 41, "a R-block" (both occurrences) should read
　　--an R-block--.

UNITED STATES PATENT AND TRADEMARK OFFICE
CERTIFICATE OF CORRECTION

PATENT NO.   :   5,956,162
DATED        :   September 21, 1999
INVENTOR(S)  :   HIROSHI NOBUTA It is certified that error appears in the above-identified patent and that said Letters Patent is hereby corrected as shown below:

COLUMN 11

Line 32, "protocal should read --protocol--.

COLUMN 14

Line 51, "to color" should read --the color--.

COLUMN 15

Line 9, "area" should read --area,--.

COLUMN 16

Line 51, "inoperable" should read --inoperable,--.

COLUMN 18

Line 23, "pages;" should read --page;--.

UNITED STATES PATENT AND TRADEMARK OFFICE
CERTIFICATE OF CORRECTION

PATENT NO. : 5,956,162

DATED : September 21, 1999

INVENTOR(S) : HIROSHI NOBUTA

It is certified that error appears in the above-identified patent and that said Letters Patent is hereby corrected as shown below:

COLUMN 19

Line 12, "pages;" should read --page;--.

Signed and Sealed this

Twenty-third Day of May, 2000

*Attest:*

Q. TODD DICKINSON

*Attesting Officer*   *Director of Patents and Trademarks*